(12) United States Patent
Hamagishi et al.

(10) Patent No.: US 11,785,201 B2
(45) Date of Patent: *Oct. 10, 2023

(54) METHOD OF DISPLAYING THREE DIMENSIONAL IMAGE AND THREE DIMENSIONAL DISPLAY APPARATUS FOR PERFORMING THE METHOD

(71) Applicant: Samsung Display Co., Ltd., Yongin-si (KR)

(72) Inventors: Goro Hamagishi, Hwaseong-si (KR);
Ryota Odake, Hwaseong-si (KR);
Seung-Jun Yu, Suwon-si (KR);
Sang-Min Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 119 days.

This patent is subject to a terminal disclaimer.

(21) Appl. No.: 17/543,286

(22) Filed: Dec. 6, 2021

(65) Prior Publication Data

US 2022/0201272 A1 Jun. 23, 2022

Related U.S. Application Data

(60) Continuation of application No. 15/883,926, filed on Jan. 30, 2018, now Pat. No. 11,196,986, which is a
(Continued)

(30) Foreign Application Priority Data

Jul. 27, 2012 (KR) ........................ 10-2012-0082247

(51) Int. Cl.
*H04N 13/341* (2018.01)
*H04N 13/305* (2018.01)
(Continued)

(52) U.S. Cl.
CPC ........... *H04N 13/341* (2018.05); *G02B 30/24* (2020.01); *G02B 30/27* (2020.01); *H04N 13/305* (2018.05);
(Continued)

(58) Field of Classification Search
CPC .. H04N 13/341; H04N 13/305; H04N 13/312; H04N 13/315; H04N 13/359;
(Continued)

(56) References Cited

U.S. PATENT DOCUMENTS

| 5,831,765 A | 11/1998 | Nakayama et al. |
| 5,991,073 A | 11/1999 | Woodgate et al. |

(Continued)

FOREIGN PATENT DOCUMENTS

| CN | 1834728 | 9/2006 |
| CN | 101907774 | 12/2010 |

(Continued)

OTHER PUBLICATIONS

Non-Final Office Action dated Nov. 10, 2015, in U.S. Appl. No. 13/863,015.
(Continued)

*Primary Examiner* — Jeff A Burke
*Assistant Examiner* — Sihar A Karwan
(74) *Attorney, Agent, or Firm* — H.C. Park & Associates, PLC

(57) ABSTRACT

A method of displaying a three-dimensional ("3D") image, the method includes determining a shutter electrode of an unit part included in a shutter panel as a left-eye electrode and a right-eye electrode, the unit part including 'n' shutter electrodes (herein, n is a natural number), selectively driving the left-eye electrode and the right-eye electrode as an opening part based on an image displayed on a display panel to transmit light through the opening part, and providing
(Continued)

light transmitted through the opening part with an observer's two eyes through a lens plate, the lens plate including a plurality of lenses.

18 Claims, 25 Drawing Sheets

Related U.S. Application Data division of application No. 15/594,820, filed on May 15, 2017, now Pat. No. 9,924,158, which is a continuation of application No. 13/863,015, filed on Apr. 15, 2013, now Pat. No. 9,686,535.

(51) Int. Cl.
| | |
|---|---|
| *H04N 13/312* | (2018.01) |
| *H04N 13/315* | (2018.01) |
| *H04N 13/359* | (2018.01) |
| *H04N 13/366* | (2018.01) |
| *H04N 13/398* | (2018.01) |
| *G02B 30/24* | (2020.01) |
| *G02B 30/27* | (2020.01) |
| *G09G 3/00* | (2006.01) |
| *G02B 30/00* | (2020.01) |
| *G06F 13/00* | (2006.01) |
| *G09G 3/36* | (2006.01) |

(52) U.S. Cl.
CPC ......... *H04N 13/312* (2018.05); *H04N 13/315* (2018.05); *H04N 13/359* (2018.05); *H04N 13/366* (2018.05); *H04N 13/398* (2018.05); *G02B 30/00* (2020.01); *G06F 13/00* (2013.01); *G09G 3/003* (2013.01); *G09G 3/36* (2013.01); *H04N 2213/008* (2013.01)

(58) Field of Classification Search
CPC ............... H04N 13/366; H04N 13/398; H04N 2213/008; G02B 30/24; G02B 30/27; G02B 30/00; G06F 13/00; G09G 3/003; G09G 3/36

See application file for complete search history.

(56) References Cited

U.S. PATENT DOCUMENTS

| | | | |
|---|---|---|---|
| 6,014,164 | A | 1/2000 | Woodgate et al. |
| 6,304,288 | B1 * | 10/2001 | Hamagishi ........... H04N 13/346 |
| | | | 348/E13.05 |
| 6,337,721 | B1 * | 1/2002 | Hamagishi ............ G02B 30/27 |
| | | | 348/E13.05 |
| 7,139,042 | B2 | 11/2006 | Nam et al. |
| 7,450,188 | B2 | 11/2008 | Schwerdtner |
| 7,561,331 | B2 | 7/2009 | Hamagashi |
| 8,520,062 | B2 | 8/2013 | Kim et al. |
| 2007/0115230 | A1 | 5/2007 | Tajiri et al. |
| 2007/0165145 | A1 | 7/2007 | Sugiyama |
| 2009/0102763 | A1 | 4/2009 | Border et al. |
| 2011/0050867 | A1 | 3/2011 | Hasegawa |
| 2014/0146023 | A1 | 5/2014 | Hamagishi et al. |

FOREIGN PATENT DOCUMENTS

| | | |
|---|---|---|
| CN | 102193240 | 9/2011 |
| CN | 202168171 | 3/2012 |
| CN | 202351566 | 7/2012 |
| JP | 2005-092103 | 4/2005 |
| KR | 10-2004-0103724 | 12/2004 |
| KR | 10-2007-0019968 | 2/2007 |
| KR | 10-2007-0023849 | 3/2007 |
| KR | 100765131 | 10/2007 |
| KR | 10-2009-0060633 | 6/2009 |
| KR | 10-2012-0015259 | 2/2012 |

OTHER PUBLICATIONS

Final Office Action dated May 6, 2016, in U.S. Appl. No. 13/863,015.
Notice of Allowance dated Feb. 13, 2017, in U.S. Appl. No. 13/863,015.
Chinese Office Action dated Apr. 5, 2016, in Chinese Patent Application No. 201310228909.8.
Chinese Office Action dated Nov. 8, 2016, in Chinese Patent Application No. 201310228909.8.
Notice of Allowance dated Jan. 29, 2018, in U.S. Appl. No. 15/594,820.
Office Action dated Jul. 19, 2018, in the Korean Patent Application No. 10-2012-0082247.
Non-Final Office Action dated Apr. 20, 20219, in U.S. Appl. No. 15/883,926.
Final Office Action dated Oct. 1, 2019, in U.S. Appl. No. 15/883,926.
Advisory Action dated Dec. 17, 2019, in U.S. Appl. No. 15/883,926.
Non-Final Office Action dated Feb. 4, 2020, in U.S. Appl. No. 15/883,926.
Final Office Action dated Sep. 3, 2020, in U.S. Appl. No. 15/883,926.
Advisory Action dated Dec. 22, 2020, in U.S. Appl. No. 15/883,926.
Non-Final Office Action dated Apr. 14, 2021, in U.S. Appl. No. 15/883,926.
Notice of Allowance dated Jul. 30, 2021, in U.S. Appl. No. 15/883,926.

* cited by examiner $J = mE/3(d-m)$

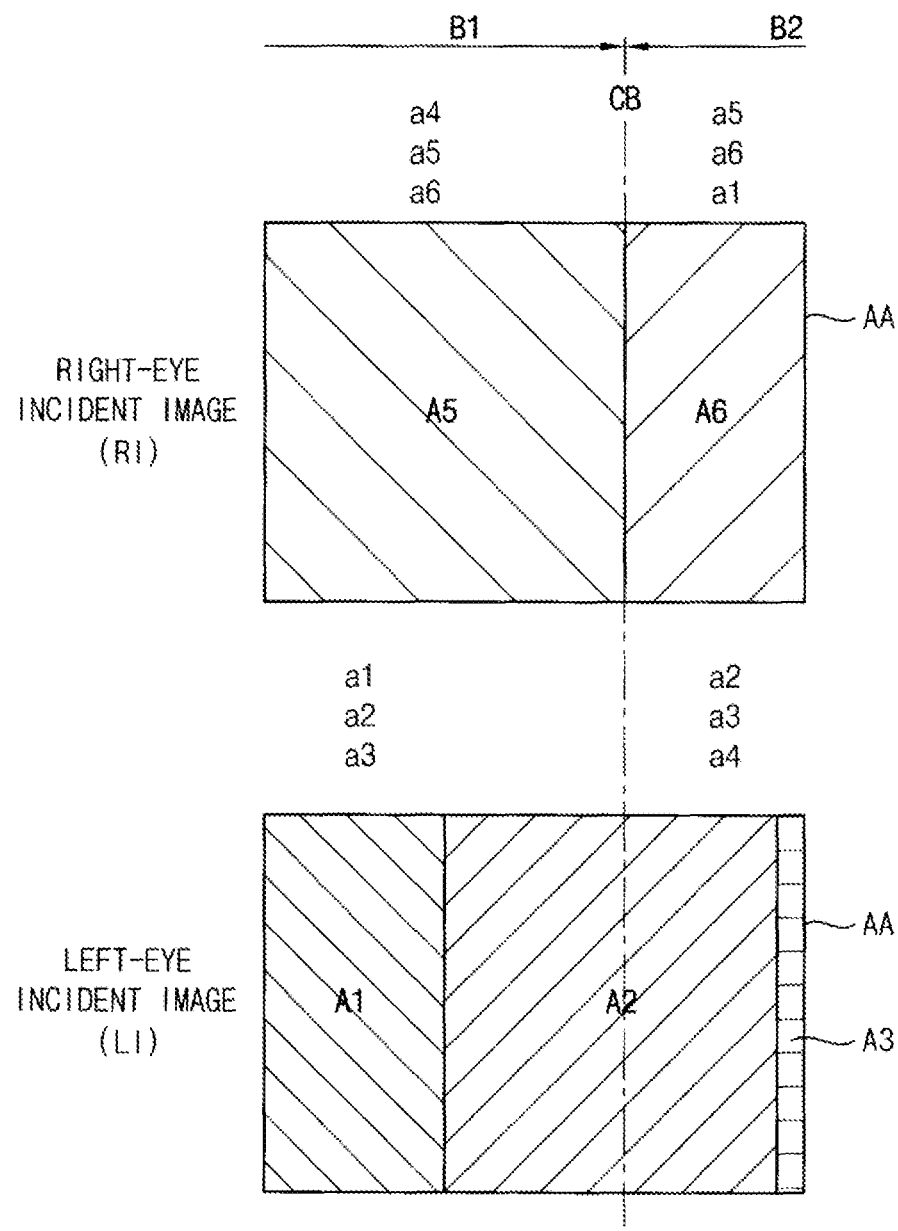

$J = gE/5(g-d)$

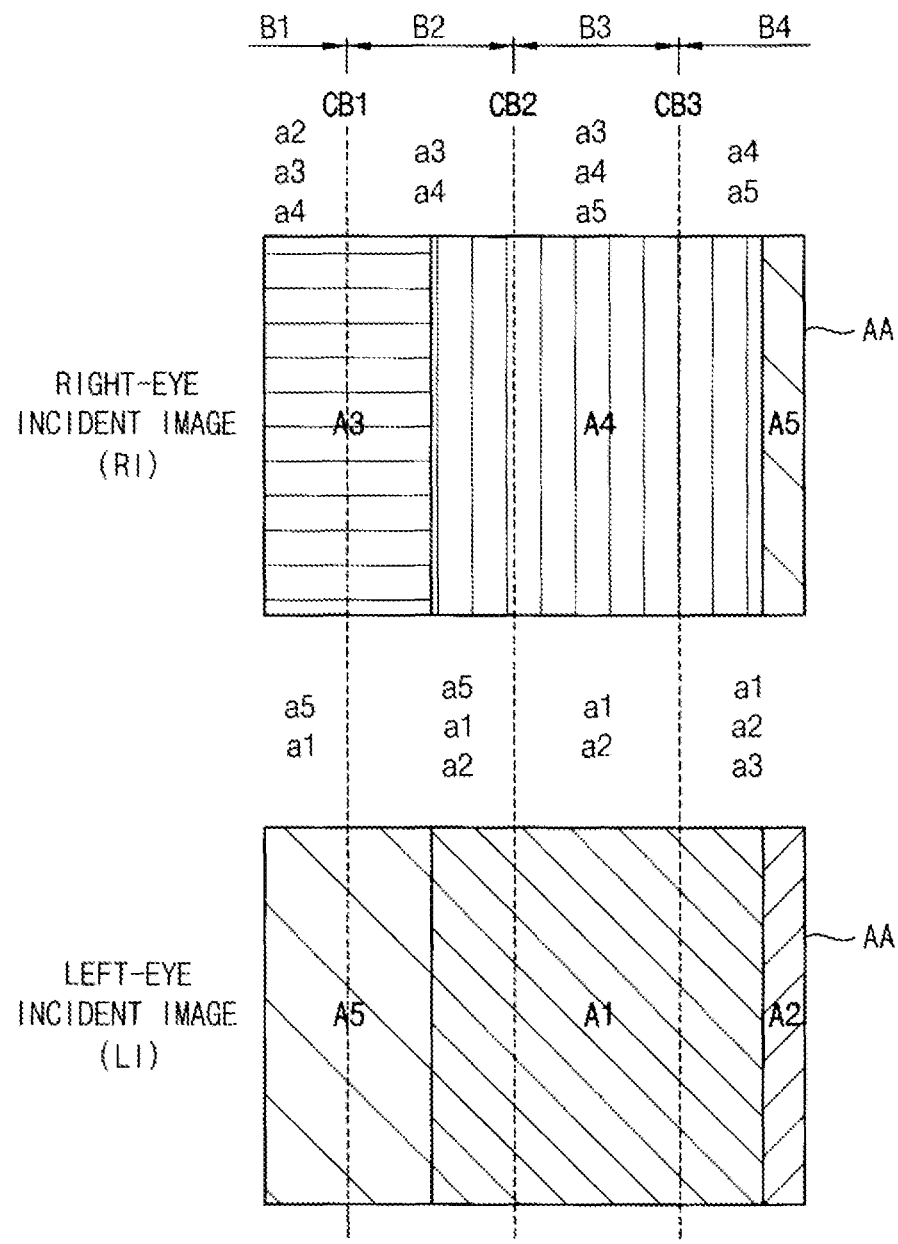

METHOD OF DISPLAYING THREE DIMENSIONAL IMAGE AND THREE DIMENSIONAL DISPLAY APPARATUS FOR PERFORMING THE METHOD

This application is a Continuation of U.S. patent application Ser. No. 15/883,926, filed Jan. 30, 2018, which is a Divisional of U.S. patent application Ser. No. 15/594,820, filed on May 15, 2017, now issued as U.S. Pat. No. 9,924,158, which is a Continuation of U.S. patent application Ser. No. 13/863,015, filed on Apr. 15, 2013, now issued as U.S. Pat. No. 9,686,535, and claims priority from and the benefit of Korean Patent Application No. 10-2012-0082247, filed on Jul. 27, 2012, each of which is hereby incorporated by reference for all purposes as if fully set forth herein.

BACKGROUND OF THE INVENTION

Field of the Invention

Exemplary embodiments of the present invention relate to a method of displaying a three-dimensional ("3D") image and a 3D display apparatus for performing the method. More particularly, exemplary embodiments of the present invention relate to a method of displaying a 3D image for increasing a display quality of a 3D image and a 3D display apparatus for performing the above-mentioned method.

Discussion of the Background

Generally, a liquid crystal display ("LCD") displays a two-dimensional ("2D") image. Recently, 3D displays using an LCD have been developed since demands for the 3D image have been increased in various industrial fields such as game and movie industries.

Generally, the 3D image display apparatus displays the 3D image using the principle of binocular parallax through two eyes of a human. For example, since the eyes of a human are spaced apart from each other, the eyes provide two different images to the brain. This is the process by which a brain exploits the parallax due to the different views from the eye to gain depth perception and estimate distances to objects. Thus, the observer may watch the 3D image to recognize the stereoscopic image through the display apparatus.

Typically, the stereoscopic image display apparatus is classified into a stereoscopic type, which requires viewer to wear glasses to perceive the 3D images and an auto-stereoscopic type, which does not require the viewer glasses. The stereoscopic type may include a passive polarized glasses method with a polarized filter having a different polarized axis according to two eyes, and an active shutter glasses method. In the active shutter glasses method, a left-eye frame image and a right-eye frame image are time-divided to be periodically displayed, and a pair of glasses which sequentially open or close a left-eye shutter and a right-eye shutter respectively synchronized with the periods are used.

Recently, the stereoscopic image display apparatus includes a shutter panel which is transmits and blocks light emitting from the back-light unit, a lenticular lens which changes the light through the shutter panel into a directional light and a liquid crystal panel which sequentially displays a left-eye image and a right-eye image during a frame.

SUMMARY OF THE INVENTION

These and other needs are addressed by the present invention, in which exemplary embodiments of the present invention provide a method of displaying a 3D image capable of displaying a 3D image according to an observer's position.

Exemplary embodiments of the present invention also provide a display apparatus for performing the method of displaying the 3D image.

Exemplary embodiments of the invention disclose a method of displaying a three-dimensional ("3D") image. The method includes designating shutter electrodes of a unit part as a left-eye electrode or a right-eye electrode. The unit part includes 'n' shutter electrodes (herein, n is a natural number). The method also includes selectively driving the left-eye electrode and the right-eye electrode as an opening part, to transmit light through the opening part, based on an image to be displayed on the display panel. The method includes providing light transmitted through the opening part to an observer via a lens plate unit, the lens plate unit comprising a plurality of lenses.

Exemplary embodiments of the invention disclose a three-dimensional ("3D") display apparatus. The display apparatus includes a display panel configured to display a right-eye image and a left-eye image. The display apparatus also includes a shutter panel including a unit part which includes a plurality of shutter electrodes. The unit part is configured to operate as an opening part transmitting a light and as a blocking part blocking the light. The display apparatus includes a lens plate including a plurality of lenses arranged in a direction and providing the light transmitted through the opening part with an observer's right-eye and left-eye. The display apparatus includes a control part to determine the shutter electrodes of the unit part as a right-eye electrode and a left-eye electrode. The display apparatus includes a shutter driving part selectively to drive the right-eye electrode and the left-eye electrode as the opening part based on an image displayed on the display panel.

Exemplary embodiments of the invention disclose a display. The display includes a processor of a control part configured to designate shutter electrodes based on an information of an observer's position. The designation includes a portion of n shutter electrodes being determined as a right-eye electrode and the other portion of the n shutter electrodes being determined as a left-eye electrode. The processor is configured to selectively control the left-eye electrode and the right-eye electrode associated with opening and to selectively incident on the observer's right eye or left eye based on the determined shutter electrodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIGS. 11A and 11B are diagrams illustrating a method of displaying a 3D image when the observer is located further away from the OVD according to the 3D display apparatus as shown in FIG. 10.

FIGS. 13A and 13B are diagrams illustrating a method of displaying a 3D image when the observer is located further away from the OVD according to the 3D display apparatus as shown in FIG. 12.

DETAILED DESCRIPTION OF THE ILLUSTRATED EMBODIMENTS

Figure 1:
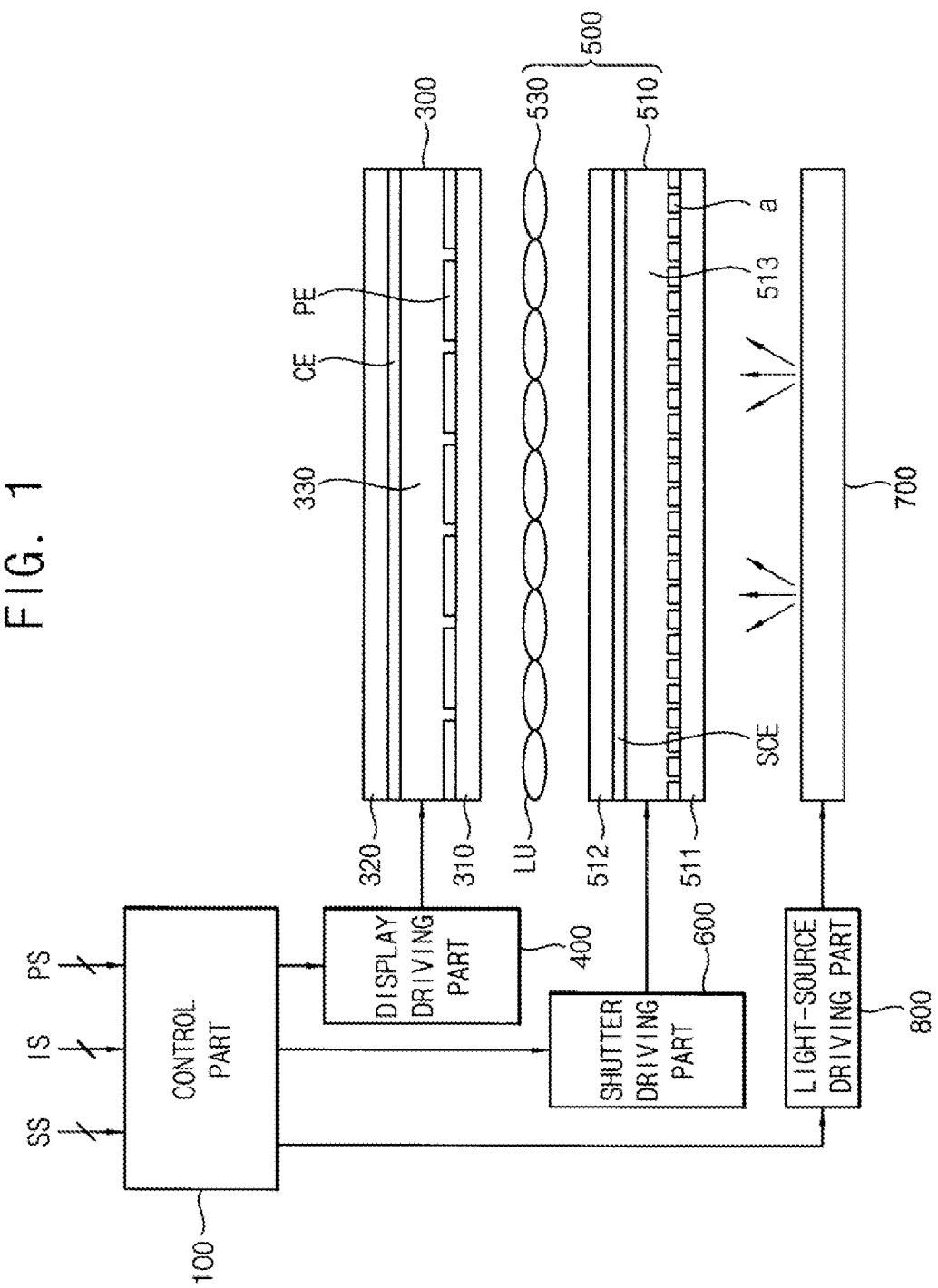
FIG. 1 is a block diagram illustrating a three-dimensional "3D" display apparatus according to exemplary embodiments of the invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

FIG. 1 is a block diagram illustrating a three-dimensional ("3D") display apparatus according to exemplary embodiments of the invention.

Referring to FIG. 1, the 3D display apparatus may include a control part 100, a display panel 300, a display driving part 400, a 3D module 500, a shutter driving part 600, a light-source part 700 and a light-source driving part 800.

The control part 100 generally controls an operation of the 3D display apparatus. The control part 100 receives a synchronization signal SS, a 3D image signal IS, and a position signal PS corresponding to an observer's position. The control part 100 may correct the 3D image signal using a preset compensation algorithm and provides the display driving part 400 with the corrected 3D image signal. According to the present exemplary embodiments, the control part 100 controls the shutter driving part 600 and the display driving part 400 based on the position signal PS.

The display panel 300 may include a first display substrate 310, a second display substrate 320 and a display liquid crystal layer 330. The first display substrate 310 may include a plurality of gate lines, a plurality of data lines, a plurality of thin film transistors and a plurality of pixel electrodes PE. The second display substrate 320 may include a pixel common electrode CE opposite to the pixel electrodes PE and a plurality of color filters. The display liquid crystal layer 330 displays a grayscale of an image based on a potential difference between the pixel electrode PE and the pixel common electrode CE.

The display driving part 400 displays the 3D image on the display panel 300 based on a control of the control part 100. The 3D image may include a left-eye image and a right-eye image. The display panel 300 may be driven with a frame frequency of about 120 Hz.

The 3D module 500 may include a shutter panel 510 and a lens plate 530. The 3D module 500 may be disposed under the display panel 300.

The shutter panel 510 may include a first shutter substrate 511, a second shutter substrate 512 and a shutter liquid crystal layer 513. The shutter panel 510 is disposed between the light-source part 700 and the lens plate 530. The first shutter substrate 511 may include a plurality of shutter electrodes 'a'. The second shutter substrate 512 may include a shutter common electrode SCE opposite to the shutter electrodes 'a'. The shutter liquid crystal layer 513 operates as an opening part transmitting light and a blocking part blocking the light based on a potential difference between the shutter electrodes a and the shutter common electrode SCE. For example, the shutter panel 510 includes a plurality of unit parts and each of the unit parts includes n shutter electrodes a1, a2, . . . , an. A partial part of the n shutter electrodes in the unit part is operated as a left-eye electrode and a remaining part of the n shutter electrodes in the unit part is operated as a right-eye electrode. The left-eye electrode and the right-eye electrode may be determined based on the observer's position. Thus, when the right-eye electrode is operated as the opening part, the light transmitted through the opening part is incident on the observer's right-eye, and when the left-eye electrode is operated as the opening part, the light transmitted through the opening part is incident on the observer's left-eye.

The lens plate 530 may include a plurality of lenses LU. For example, the lens plate 530 may be disposed on the shutter panel 510. The lens plate 530 may diffract the light transmitted through the opening part of the shutter panel 510 into the observer's two eyes. The lenses LU may include a lens for the 3D image which diffracts the 3D image into a plurality of viewing points. For example, the lens for the 3D image may be a lenticular lens. A longitudinal direction of the lens may be in parallel with a longitudinal direction of the shutter electrodes 'a'.

The shutter driving part 600 drives the shutter panel 510 according to a control of the control part 100. The shutter panel 510 may be driven with a frame frequency of about 120 Hz.

By way of example, the light-source part 700 may be disposed under the shutter panel 510 and provides the shutter panel 510 with the light. The light-source part 700 may have a direct illumination type or an edge illumination type. The light-source part of the edge illumination type may include a light guide plate ("LGP") disposed under the shutter panel 510 and at least one light-source disposed at least one edge of the LGP. The light-source part of the direct illumination type may omit the LGP and may include at least one light-source disposed under the shutter panel 510.

The light-source driving part 800 drives the light-source part 700 according to a control of the control part 100. The light-source driving part 800 drives the light-source part 700 in a global blinking method. The light-source driving part 800 divides the light-source part 700 into a plurality of light-emitting blocks along a scanning direction of the display panel 300, and may sequentially drive the light-emitting blocks according to the image displayed on the display panel 300 such as a scanning method.

Figure 2:
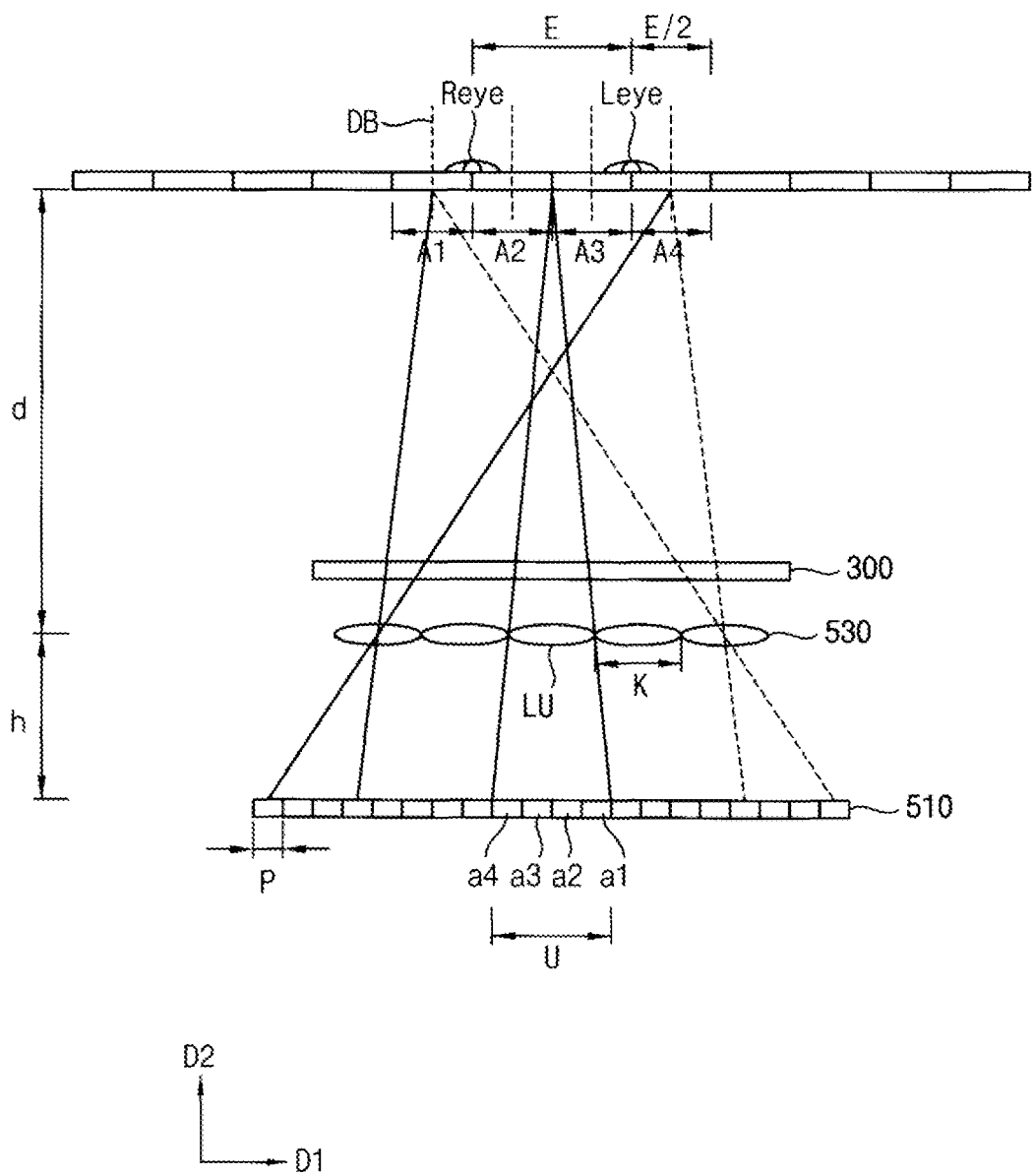
FIG. 2 is a diagram illustrating the 3D display apparatus as shown in FIG. 1.
Figure 3:
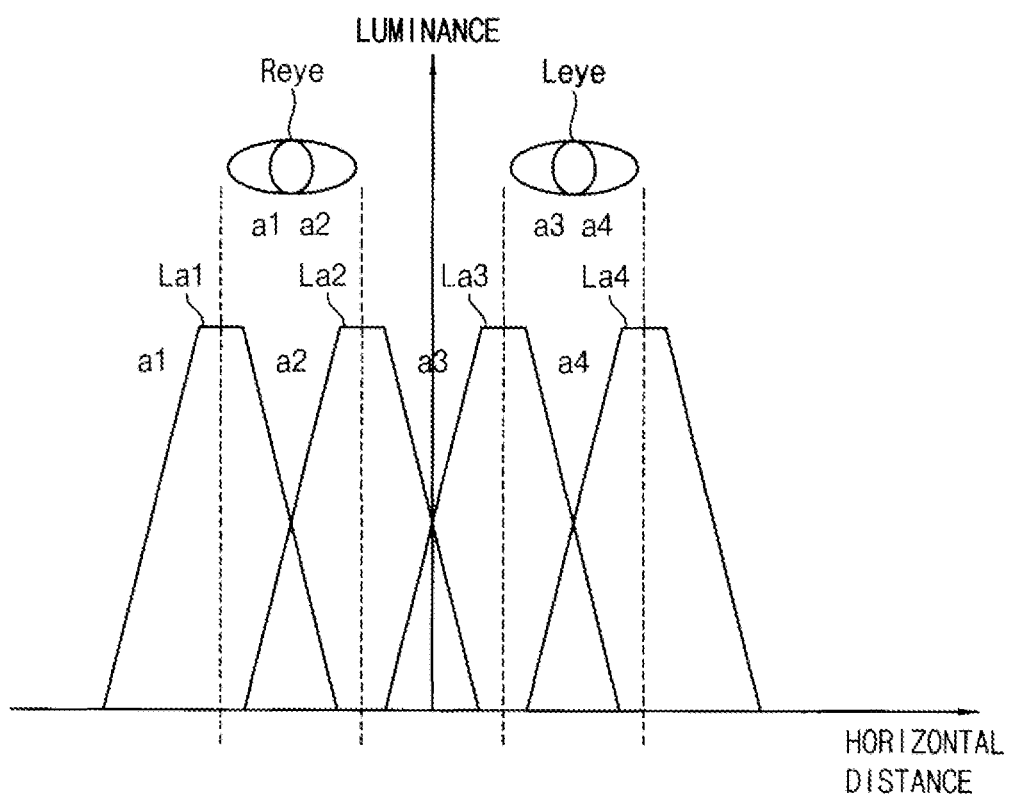
FIG. 3 is a diagram illustrating luminance profile of an opening as shown in FIG. 2.

FIG. 2 is a diagram illustrating the 3D display apparatus as shown in FIG. 1. FIG. 3 is a diagram illustrating luminance of an opening as shown in FIG. 2. FIG. 3 is a diagram illustrating luminance profile of an opening as shown in FIG. 2.

Referring to FIGS. 1, 2 and 3, for example, the 3D display apparatus may include the shutter panel 510. The shutter panel 510 may include a unit part U having four shutter electrodes, which are sequentially arranged, corresponding to one lens LU. The unit part may include a first shutter electrode a1, a second shutter electrode a2, a third shutter electrode a3 and a fourth shutter electrode a4.

According to the present exemplary embodiments, an optimum view distance ("OVD") referred to as 'd' of the observer may be defined as the following Equation 1.

$$\frac{E}{2}: P = d:h \qquad \text{Equation 1}$$
$$d: K = (d+h):4P$$

Herein, E is a distance between the observer's right-eye and the observer's left-eye, P is a width of the shutter electrode in a first direction D1, K is a width of the lens LU in the first direction D1 and h is a distance between the shutter electrode a and lens LU in a second direction D2 crossing the first direction D1.

When the unit part U includes n shutter electrodes, a concentrating area in which the light transmitted through each shutter electrode is concentrated, is determined at the OVD, and the concentrating area may have a width of about 2E/n in the first direction D1.

As shown in FIG. 2, when each of the first, second, third and fourth shutter electrodes a1, a2, a3 and a4 is operated as the opening part, lights transmitted through the first, second, third and fourth shutter electrodes a1, a2, a3 and a4 are respectively concentrated in first, second, third and fourth concentrating areas A1, A2, A3 and A4 at the OVD. Each of the first, second, third and fourth concentrating areas A1, A2, A3 and A4 may have a width of about E/2 in the first direction D1. Thus, the first, second, third and fourth concentrating areas A1, A2, A3 and A4 respectively corresponding to the first, second, third and fourth shutter electrodes a1, a2, a3 and a4 are distributed at the OVD.

The luminance profile shown in FIG. 3 has a horizontal axis being a horizontal distance at the OVD d and a vertical axis being a luminance of the lights transmitted through the first, second, third and fourth shutter electrodes a1, a2, a3 and a4 operating as the opening part. Referring to the luminance profile shown in FIG. 3, the lights transmitted through the first, second, third and fourth shutter electrodes a1, a2, a3 and a4 operating as the opening part have first, second, third and fourth luminance profiles La1, La2, La3 and La4 at the OVD.

When the first shutter electrode a1 is operated as the opening part, the light transmitted through the first shutter electrode a1 has the first luminance profile La1 such as a sine curve. When the second shutter electrode a2 is operated as the opening part, the light transmitted through the second shutter electrode a2 has the second luminance profile La2 delayed by about E/2 from the first luminance profile La1. When the third shutter electrode a3 is operated as the opening part, the light transmitted through the third shutter electrode a3 has the third luminance profile La3 delayed by about E/2 from the second luminance profile La2. When the fourth shutter electrode a4 is operated as the opening part, the light transmitted through the fourth shutter electrode a4 delayed by about E/2 from the third luminance profile La3.

According to the first to fourth luminance profiles La1, La2, La3 and La4, when the first and second shutter electrodes a1 and a2 are determined as the right-eye electrode, remaining third and fourth shutter electrodes a3 and a4 may be determined as the left-eye electrode. Alternatively, when the second and third shutter electrodes a2 and a3 are determined as the right-eye electrode, remaining the fourth and first shutter electrodes a4 and a1 may be determined as the left-eye electrode.

As described above, when the observer is located at the OVD, two shutter electrodes in the unit part U of the shutter panel 510 may be determined as the right-eye electrode and remaining two shutter electrodes in the unit part U of the shutter panel 510 may be determined as the left-eye electrode.

Figure 4:
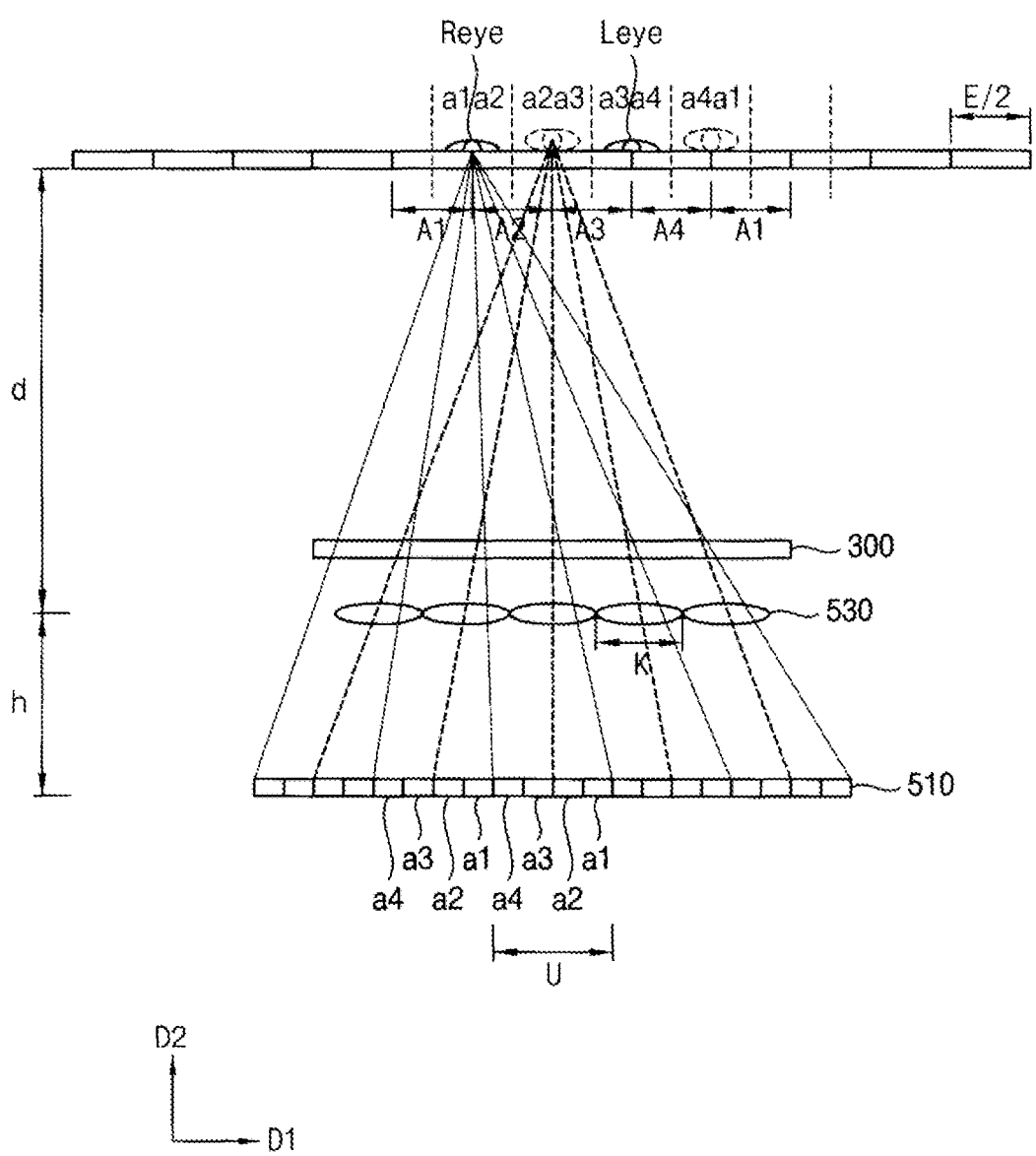
FIG. 4 is a diagram illustrating a method of displaying a 3D image when an observer is located within an optimum view distance ("OVD") according to the 3D display apparatus as shown in FIG. 2.

FIG. 4 is a diagram illustrating a method of displaying a 3D image when an observer is located within an OVD according to the 3D display apparatus as shown in FIG. 2.

Referring to FIGS. 3 and 4, for example, the unit part U may include the first, second, third and fourth shutter electrodes a1, a2, a3 and a4. The lights transmitted through the first, second, third and fourth shutter electrodes a1, a2, a3 and a4 operating as the opening part are respectively concentrated in the first, second, third and fourth concentrating areas A1, A2, A3 and A4 at the OVD. Each of the first, second, third and fourth concentrating areas A1, A2, A3 and A4 has a width of about E/2 in the first direction D1.

Hereinafter, when the observer is located at the OVD, a method of displaying the 3D image is explained. First, when the observer's right-eye Reye is located at a boundary of the first and second concentrating areas A1 and A2 and the observer's left-eye Leye is located at a boundary of the third and fourth concentrating areas A3 and A4, the method of displaying the 3D image is explained.

In this case, the control part determines the first and second shutter electrodes a1 and a2 as the right-eye electrode based on a position of the observer's right-eye Reye and determines the third and fourth shutter electrodes a3 and a4 as the left-eye electrode based on a position of the observer's left-eye Leye. Thus, during a first sub frame during which the display panel 300 displays the right-eye image, the first and second shutter electrodes a1 and a2 are operated as the opening part so that the observer's right-eye Reye may observe the right-eye image. During a second sub frame during which the display panel 300 displays the left-eye image, the third and fourth shutter electrodes a3 and a4 are operated as the opening part so that the observer's left-eye Leye may observe the left-eye image. The position of the observer's right-eye or left-eye is provided from an external tracking device which tracks the observer's eyes or an observer's head.

Next, the observer is shifted to a rightward so that the observer's right-eye Reye is located at a boundary of the second and third concentrating areas A2 and A3. In this case, the control part determines the second and third shutter electrodes a2 and a3 as the right-eye electrode based on the position of the observer's right-eye Reye and determines the remaining fourth and first shutter electrodes a4 and a1 as the left-eye electrode. Thus, during the first sub frame during which the display panel 300 displays the right-eye image, the second and third shutter electrodes a2 and a3 are operated as the opening part so that the observer's right-eye Reye may observe the right-eye image. During the second sub frame during which the display panel 300 displays the left-eye image, the fourth and first shutter electrodes a4 and a1 are operated as the opening part so that the observer's left-eye Leye may observe the left-eye image.

As described above, when the unit part corresponding to one lens includes four shutter electrodes and the observer is located at the OVD, two shutter electrodes of the four shutter electrodes in the unit part may be determined as the right-eye electrode and the remaining two shutter electrodes in the unit part may be determined as the left-eye electrode based on the observer's position shifted at the OVD.

According to the present exemplary embodiments, when the number n of the shutter electrode in the unit part is an even number, n/2 shutter electrodes of the partial part and n/2 shutter electrodes of the remaining part are selectively determined as the left-eye electrode and the right-eye electrode based on the observer's position shifted at the OVD. Therefore, the observer may freely observe the 3D image at the OVD.

Figure 5A:
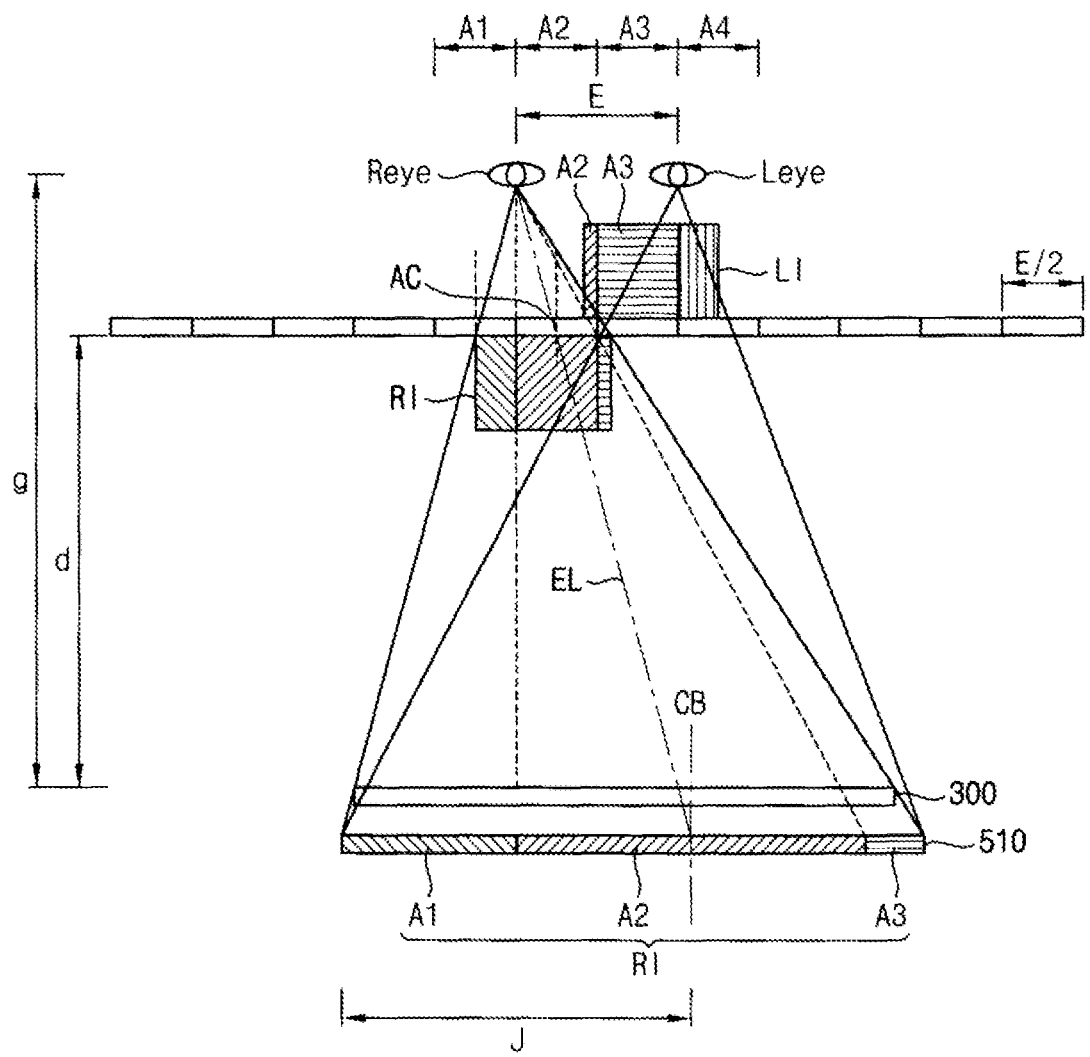
FIGS. 5A and 5B are diagrams illustrating a method of displaying a 3D image when the observer is located further away from the OVD according to the 3D display apparatus as shown in FIG. 2.
Figure 5B:
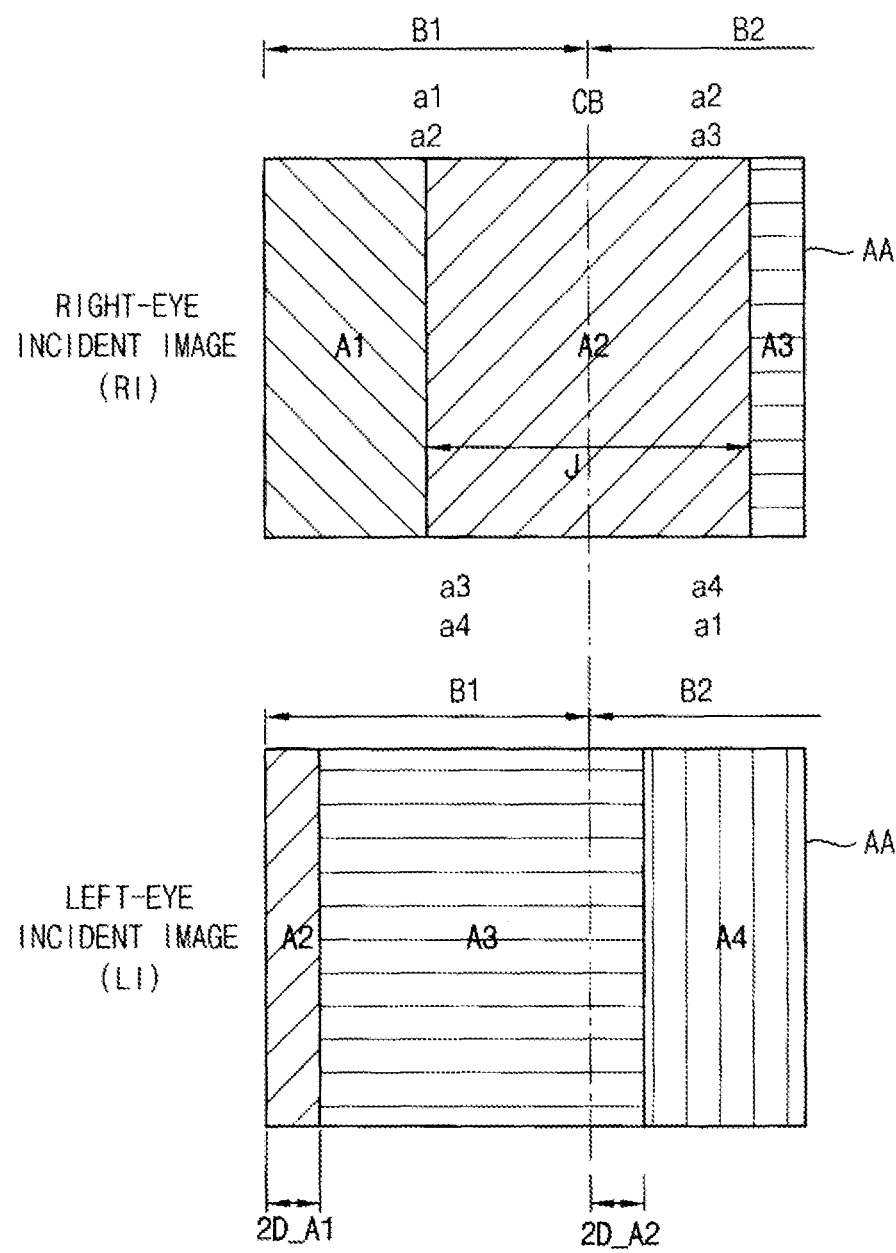

FIGS. 5A and 5B are diagrams illustrating a method of displaying a 3D image when the observer is located further away from the OVD according to the 3D display apparatus as shown in FIG. 2.

Referring to FIGS. 5A and 5B, when the observer is located further away from the OVD, the shutter panel 510 is divided into a plurality of control areas B1 and B2 based on the observer's position and the shutter electrodes in each of the control areas B1 and B2 may be controlled as left-eye electrode and the right-eye electrode.

First, the control part analyzes one of the light being incident on the observer's right-eye ("right-eye incident image") RI and light being incident on the observer's left-eye ("left-eye incident image") LI, based on the observer's position g which is located away from the OVD and the first, second, third and fourth concentrating areas A1, A2, A3 and A4 at the OVD corresponding to the first, second, third and fourth shutter electrodes a1, a2, a3 and a4. The control part determines a division boundary CB on the shutter panel 510, using a position of the observer's one eye corresponding to the analyzed incident image (RI or LI) and the first, second, third and fourth concentrating areas A1, A2, A3 and A4.

For example, the control part analyzes the right-eye incident image RI and the right-eye incident image RI includes image corresponding to the light which concentrated in the first, second and third concentrating areas A1, A2 and A3 as shown in FIG. 5A. The light transmitted through the first shutter electrode a1 operating as the opening part is concentrated in the first concentrating area A1. The light transmitted through the second shutter electrode a2 operating as the opening part is concentrated in the second concentrating area A2. The light transmitted through the third shutter electrode a3 operating as the opening part is concentrated in the third concentrating area A3.

As shown in FIG. 5B, the control part determines the division boundary CB in an active area AA of the shutter panel 510 based on the analyzed result of the right-eye incident image RI and the division boundary CB. And then the control part divides the active area AA into a first control area B1 and second control area B2 by the division boundary CB. The division boundary CB is determined by an extension line EL which connects an area in which the observer's right-eye is located with a center AC of each concentrating area. The control part determines the shutter electrodes in each of the first control area B1 and the second control area B2 as the left-eye electrode and the right-eye electrode based on the first, second and third concentrating areas A1, A2 and A3 of the right-eye incident image RI. In the first control area B1, the first and second shutter electrodes a1 and a2 corresponding to the first and second concentrating areas A1 and A2 are determined as the right-eye electrode and the remaining third and fourth shutter electrodes a3 and a4 are determined as the left-eye electrode. In the second control area B2, the second and third shutter electrodes a2 and a3 corresponding to the second and third concentrating areas A2, A3 are determined as the right-eye electrode and the remaining first and fourth shutter electrodes a1 and a4 are determined as the left-eye electrode.

Therefore, the shutter driving part drives the right-eye electrode as opening part during the first sub frame during which the display panel displays the right-eye image, and drives the left-eye electrode as the opening part during the second sub frame during which the display panel displays the left-eye image.

For example, during the first sub frame, the first and second shutter electrodes a1 and a2 of the unit part in the first control area B1 are operated as the opening part, and the second and third shutter electrodes a2 and a3 of the unit part in the second control area B2 are operated as the opening part. Thus, the right-eye image displayed on the display panel is incident on the observer's right-eye Reye so that the observer's right-eye Reye may observe the right-eye image. In this case, referring to the left-eye incident image RI analyzed based on the observer's position, the observer's left-eye Leye may observe the right-eye image by the second shutter electrode a2 which is operated as the opening part in a first area 2D_A1 of the first control area B1, and by the third shutter electrode a3 which is operated as the opening part in a second area 2D_A2 of the second control area B2.

During the second sub frame, the third and fourth shutter electrodes a3 and a4 of the unit part in the first control area B1 are operated as the opening part, and the first and fourth shutter electrodes a1 and a4 of the unit part in the second control area B2 are operated as the opening part. Thus, the left-eye image displayed on the display panel is incident on the observer's left-eye Leye so that the observer's left-eye Leye may observe the left-eye image. In this case, referring to the left-eye incident image RI analyzed based on the observer's position, the observer's left-eye Leye may not observe the left-eye image which is displayed on the first and second areas 2D_A1 and 2D_A1 of the display panel 300. On the first and second area 2D_A1 and 2D_A1, the observer's left-eye Leye may all observe the right-eye image all display right-eye image during the first and second sub frames. However, the first and second areas 2D_A1 and 2D_A1 have small rate with respect to an entire active area so that the 3D display apparatus displays the 3D image with no problem.

In the display apparatus according to the present exemplary embodiments, the number n of the shutter electrode in the unit part is the even number and n/2 is the even number. When the observer is located out of the OVD in the display apparatus according to the present exemplary embodiments, the division boundary CB on the active area AA of the shutter panel 510 is determined by the extension line connecting the center of the area in which the observer's one eye is located with the center of the concentrating area at the OVD, and the shutter electrodes in each of the control areas divided by the division boundary CB based on the analyzed incident image corresponding to the observer's one eye, are controlled as the right-eye and left-eye electrodes. Therefore, the observer may observe the 3D image at a distance g out of the OVD.

Figure 6:
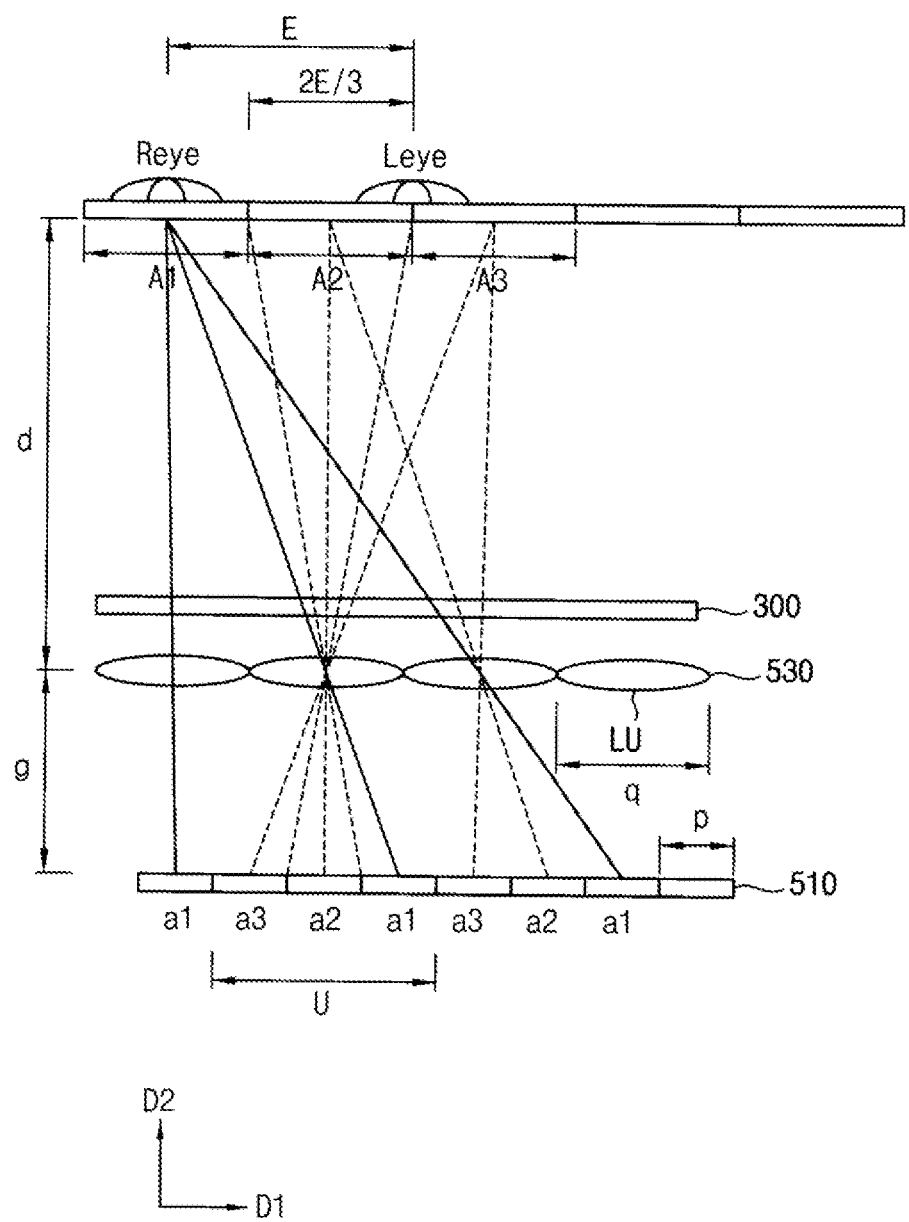
FIG. 6 is a diagram illustrating a 3D display apparatus according to exemplary embodiments of the invention.
Figure 7:
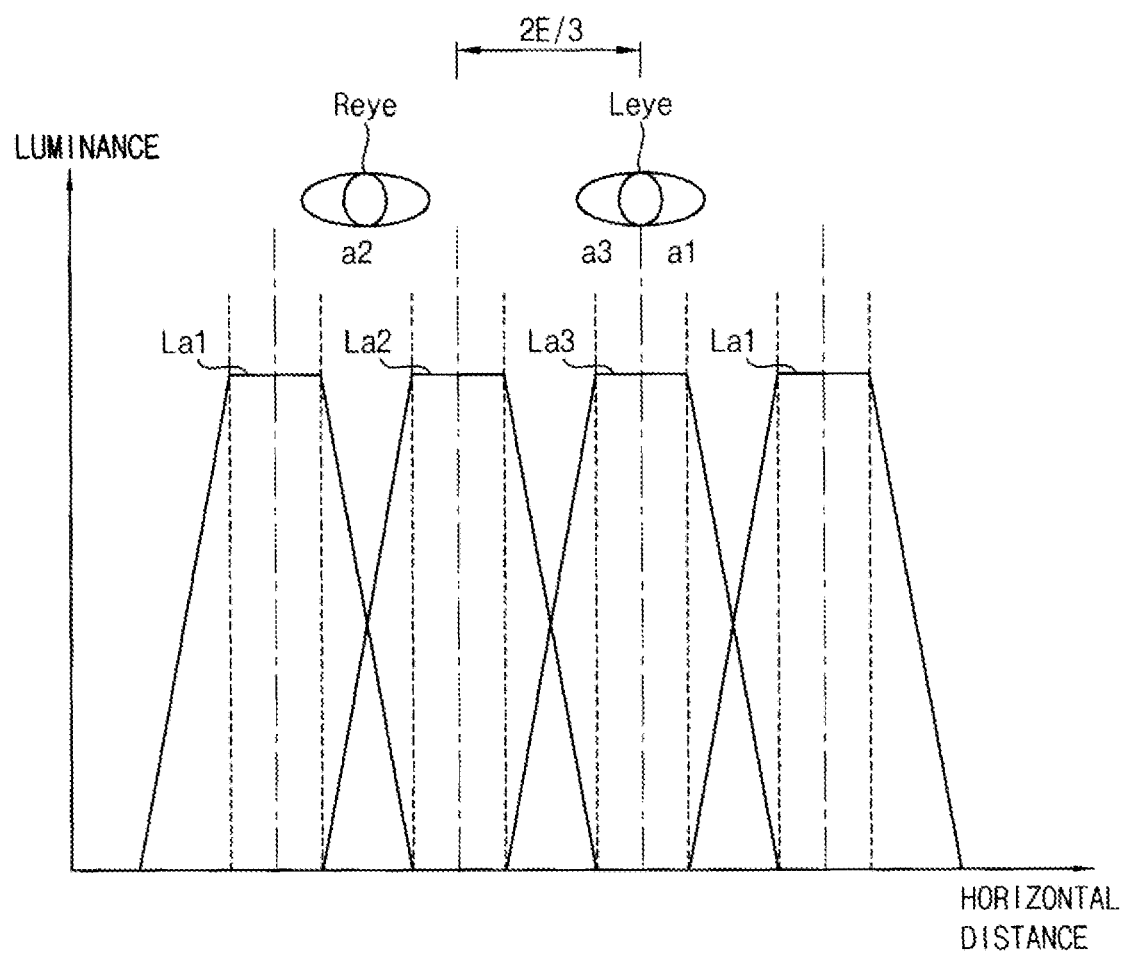
FIG. 7 is a diagram illustrating luminance profile of an opening as shown in FIG. 6.

FIG. 6 is a diagram illustrating a 3D display apparatus according to exemplary embodiments of the invention. FIG. 7 is a diagram illustrating luminance profile of an opening as shown in FIG. 6.

Referring to FIGS. 6 and 7, the 3D display apparatus includes a shutter panel 510 which includes a unit part having three shutter electrodes sequentially arranged corresponding to one lens LU. The unit part U may include a first shutter electrode a1, a second shutter electrode a2 and a third shutter electrode a3.

According to the present exemplary embodiments, an OVD of the observer is defined as the following Equation 2.

$$p:g = \frac{2E}{3} : d \qquad \text{Equation 2}$$
$$d = \frac{2Eg}{3p}$$

Herein, E is a distance between the observer's right-eye and the observer's left-eye, p is a width of the shutter electrode in a first direction D1, q is a width of the lens LU in the first direction D1 and g is a distance between the shutter panel 510 and the lens plate 530 in a second direction D2 crossing the first direction D1.

Lights transmitted through of the first, second and third shutter electrodes a1, a2 and a3 operating as the opening part are respectively concentrated in first, second and third concentrating areas A1, A2 and A3 at the OVD. Each of the first, second and third concentrating areas A1, A2 and A3 has a width of about 2E/3 in the first direction D1.

The luminance profile shown in FIG. 7 has a horizontal axis being a horizontal distance at the OVD and a vertical axis being a luminance of the lights transmitted through the first, second and third shutter electrodes a1, a2 and a3 operating as the opening part. Referring to the luminance profile shown in FIG. 7, the lights transmitted through the first, second and third shutter electrodes a1, a2 and a3 operating as the opening part have first, second and third luminance profiles La1, La2 and La3 at the OVD.

When the first shutter electrode a1 is operated as the opening part, the light transmitted through the first shutter electrode a1 has the first luminance profile La1 such as a sine curve. When the second shutter electrode a2 is operated as the opening part, the light transmitted through the second shutter electrode a2 has the second luminance profile La2 delayed by about 2E/3 from the first luminance profile La1. When the third shutter electrode a3 is operated as the opening part, the light transmitted through the third shutter electrode a3 has the third luminance profile La3 delayed by about 2E/3 from the second luminance profile La2.

According to the first to third luminance profiles La1, La2 and La3, when the second shutter electrode a2 is determined as the right-eye electrode, remaining the third and first shutter electrodes a3 and a2 may be determined as the left-eye electrode. Alternatively, when the third and first shutter electrodes a3 and a1 are determined as the right-eye electrode, remaining the second shutter electrode a2 may be determined as the left-eye electrode.

Figure 8:
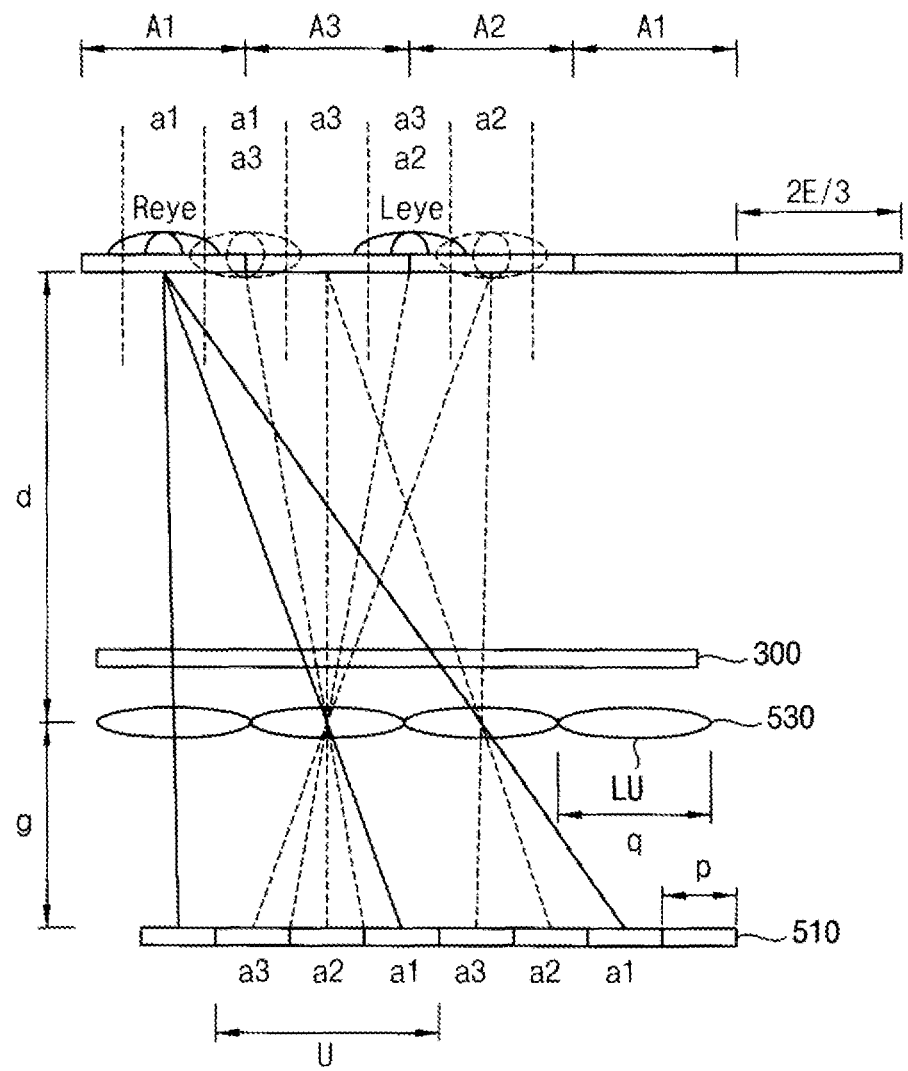
FIG. 8 is a diagram illustrating a method of displaying a 3D image when an observer is located at the OVD according to the 3D display apparatus as shown in FIG. 6.

FIG. 8 is a diagram illustrating a method of displaying a 3D image when an observer is located at the OVD according to the 3D display apparatus as shown in FIG. 6.

Referring to FIGS. 6 and 8, the unit part U may include the first, second and third shutter electrodes a1, a2 and a3. The lights transmitted through the first, second and third shutter electrodes a1, a2 and a3 operating as the opening part are respectively concentrated in the first, second and third concentrating areas A1, A2 and A3 at the OVD. Each of the first, second and third concentrating areas A1, A2 and A3 has a width of about 2E/3 in the first direction D1.

For example, when the observer's right-eye Reye is located in the first concentrating area A1 at the OVD and the observer's left-eye Leye is located in a boundary area of the second and the third concentrating area A2 and A3, a method of driving the shutter panel is explained.

In this case, the control part determines the first shutter electrode a1 of the unit part U as the right-eye electrode based on a position of observer's right-eye Reye and the second and third shutter electrodes a2 and a3 of the unit part U based on a position of observer's left-eye Leye. Thus, during the first sub frame during which the display panel 300 displays the right-eye image, the first shutter electrode a1 is operated as the opening part so that the light corresponding to the right-eye image is concentrated in the observer's right-eye Reye. During the second sub frame during which the display panel 300 displays the left-eye image, the second and third shutter electrodes a2 and a3 are operated as the opening part so that the light corresponding to the left-eye image is concentrated in the observer's left-eye Leye.

Alternatively, when the observer's right-eye Reye is located at a boundary of the first and third concentrating areas A1 and A3, the control part determines the first and third shutter electrodes a1 and a3 as the right-eye electrode based on the position of the observer's right-eye Reye and determines the remaining second shutter electrode a2 as the left-eye electrode. Thus, during the first sub frame, the first and third shutter electrodes a1 and a3 are operated as the opening part so that the light corresponding to the right-eye image is concentrated in the observer's right-eye Reye. And then, during the second sub frame, the second shutter electrode a2 is operated as the opening part so that the light corresponding to the left-eye image is concentrated in the observer's left-eye Leye.

As described above, when the unit part U includes three shutter electrodes corresponding to one lens LU, one shutter electrode of 3 shutter electrodes is operated as the right-eye electrode and the remaining two shutter electrodes of three shutter electrodes are operated as the left-eye electrode based on the observer's position at the OVD. Alternatively, two shutter electrodes of three shutter electrodes are operated as the right-eye electrode and one shutter electrode of three shutter electrodes is operated as the left-eye electrode based on the observer's position at the OVD.

According to the present exemplary embodiments, when the number n of the shutter electrode in the unit part is an odd number, the n shutter electrodes are divided into a partial part of (n+1)/2 shutter electrodes and a remaining part of (n+1)/2−1 shutter electrodes, and then the partial part and the remaining part may be selectively controlled as the right-eye electrode and the left-eye electrode based on the observer's position at the OVD.

Figure 9A:
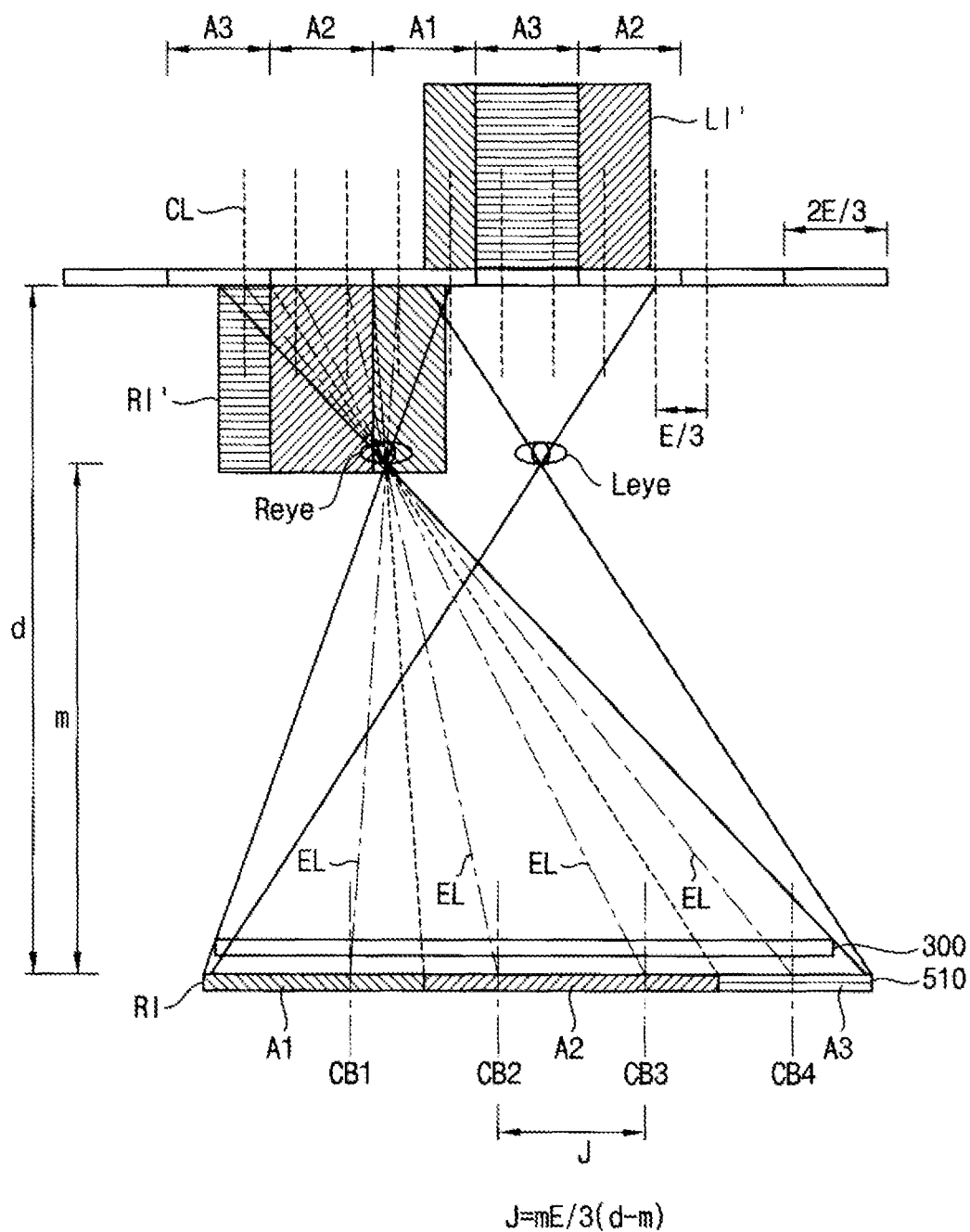
FIGS. 9A and 9B are diagrams illustrating a method of displaying a 3D image when the observer is located between a display panel and the OVD according to the 3D display apparatus as shown in FIG. 6.
Figure 9B:
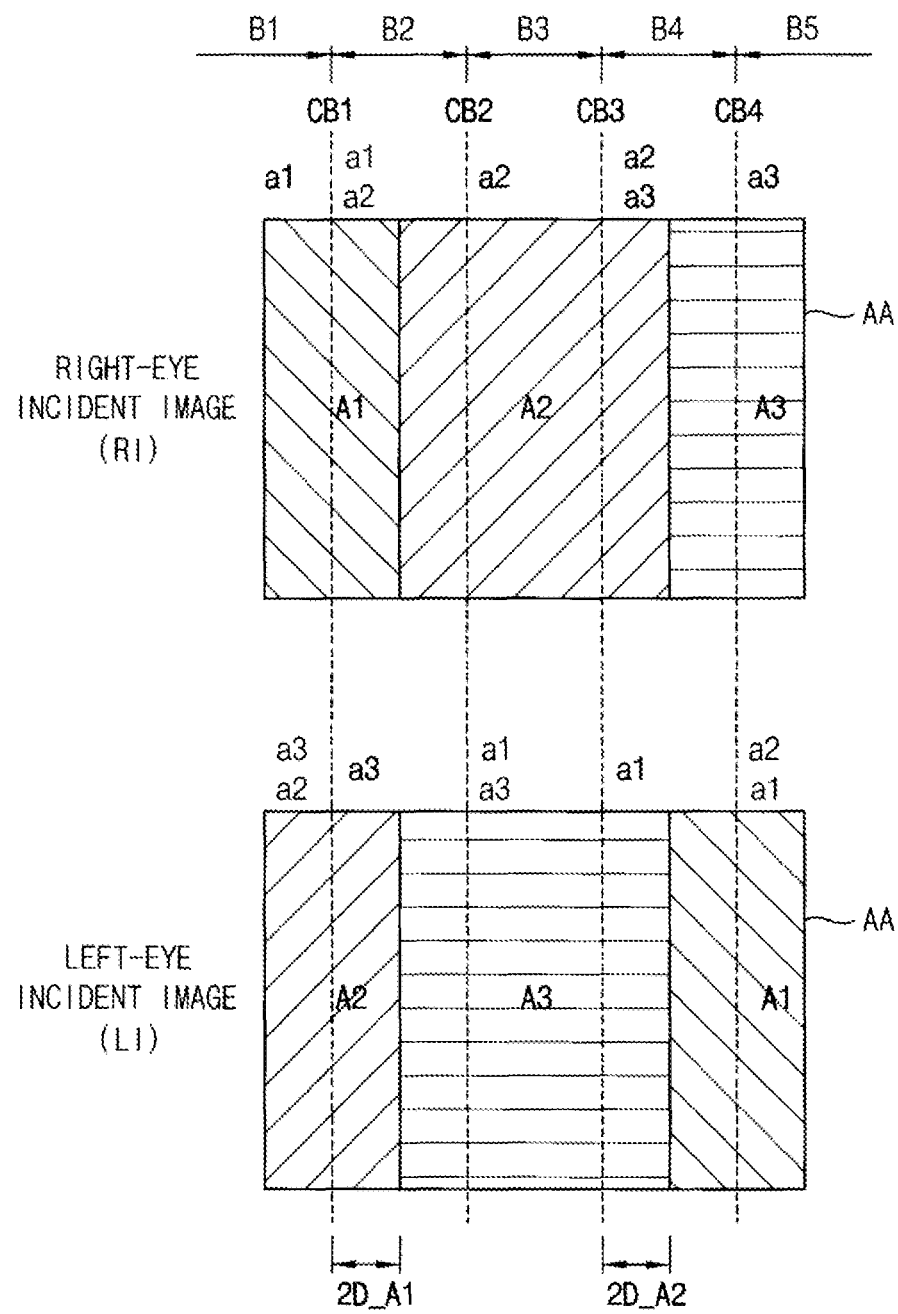

FIGS. 9A and 9B are diagrams illustrating a method of displaying a 3D image when the observer is located nearer than the OVD from the shutter panel according to the 3D display apparatus as shown in FIG. 6.

Referring to FIGS. 9A and 9B, when the observer is located nearer than the OVD from the shutter panel 510, an active area of the shutter panel is divided into a plurality of control areas based on the observer' position. And then, the shutter electrodes in each of the control areas are controlled as the left-eye electrode and the right-eye electrode.

The control part analyzes one of the light being incident on the observer's right-eye ("right-eye incident image") RI and light being incident on the observer's left-eye ("left-eye incident image") LI, based on the observer's position m which is located nearer than the OVD from the shutter panel 510 and the first, second and third concentrating areas A1, A2 and A3 at the OVD corresponding to the first, second and third shutter electrodes a1, a2 and a3.

For example, the control part analyzes the right-eye incident image RI. According to the analyzed right-eye incident image RI, the right-eye incident image RI being incident on the observer's right-eye located at a near distance m as shown in FIG. 9B is a bilateral symmetry with respect to a right-eye incident image RI being incident on the observer's right-eye located at the OVD as shown in FIG. 9A.

The right-eye incident image RI as shown in FIG. 9B includes images corresponding to the light which concentrated in the first, second and third concentrating areas A1, A2 and A3 at the OVD. The light transmitted through the first shutter electrode a1 operating as the opening part is concentrated in the first concentrating area A1. The light transmitted through the second shutter electrode a2 operating as the opening part is concentrated in the second concentrating area A2. The light transmitted through the third shutter electrode a3 operating as the opening part is concentrated in the third concentrating area A3.

And then, the control part determines division boundaries CB1, CB2, CB3 and CB4 on the shutter panel 510 based on the first, second and third concentrating areas A1, A2 and A3 at the OVD, to control the shutter panel 510. As shown in FIG. 9A, the division boundaries CB1, CB2, CB3 and CB4 are determined by extension lines EL. Each of the extension lines EL connects a center of an area in which the observer's right-eye Reye is located with a center of a connecting line. The connecting line connects a center of the concentrating area with a boundary of the concentrating area.

As shown in FIG. 9B, the control part determines the division boundaries CB1, CB2, CB3 and CB4 on the active area AA of the shutter panel 510 based on the right-eye incident image RI. And then control part divides the active area AA into first, second, third, fourth and fifth control area B1, B2, B3, B4 and B5 based on the by the division boundaries CB1, CB2, CB3 and CB4.

The control part determines the shutter electrodes in each of the first, second, third, fourth and fifth control areas B1, B2, B3, B4 and B5 as the left-eye electrode and the right-eye electrode based on the first, second and third concentrating areas A1, A2 and A3 of the right-eye incident image RI. Referring to FIG. 9B, in the first control area B1, the first shutter electrode a1 corresponding to the first concentrating area A1 is determined as the right-eye electrode, and the remaining second and third shutter electrodes a2 and a3 are determined as the left-eye electrode. In the second control area B2, the first and second shutter electrodes a1 and a2 corresponding to the first and second concentrating areas A1 and A2 are determined as the right-eye electrode and the remaining third shutter electrode a3 is determined as the left-eye electrode. In the third control area B3, the second shutter electrode a2 corresponding to the second concentrating area A2 is determined as the right-eye electrode and the remaining first and third shutter electrodes a1 and a3 are determined as the left-eye electrode. In the fourth control area B4, the second and third shutter electrodes a2 and a3 corresponding to the second and third concentrating areas A2 and A3 are determined as the right-eye electrode and the remaining first shutter electrode a1 is determined as the left-eye electrode. In the fifth control area B5, the third shutter electrode a3 corresponding to the third concentrating area A3 is determined as the right-eye electrode and the remaining first and second shutter electrodes a1 and a2 are determined as the left-eye electrode.

Therefore, the shutter driving part drives the right-eye electrode as the opening part during the first sub frame during which the display panel 300 displays the right-eye image and the left-eye electrode as the opening par during the second sub frame during which the display panel 300 displays the left-eye image.

For example, during the first sub frame, the first shutter electrode a1 in the first control area B1 is operated as the opening part, the first and second shutter electrodes a1 and a2 in the second control area B2 are operated as the opening part, the second shutter electrode a2 in the third control area B3 is operated as the opening part, the second and third shutter electrodes a2 and a3 in the fourth control area B4 are operated as the opening part, and the third shutter electrode a3 in the fifth control area B5 is operated as the opening part. Therefore, the right-eye image displayed on the display panel 300 is concentrated in the observer's right-eye Reye so that the observer may observe the right-eye image. In this case, referring to the left-eye incident image RI analyzed based on the observer's position, in a first area 2D_A1 of the second control area B2, the observer's left-eye Leye may observe the right-eye image by the second shutter electrode a2 operating as the opening part. In a second area 2D_A2 of the fourth control area B4, the observer's left-eye Leye may observe the right-eye image by the third shutter electrode a3 operating as the opening part.

During the second sub frame, the second and third shutter electrodes a2 and a3 in the first control area B1 are operated as the opening part, the third shutter electrode a3 in the second control area B2 is operated as the opening part, the first and third shutter electrodes a1 and a3 in the third control area B3 are operated as the opening part, the first shutter electrode a1 in the fourth control area B4 is operated as the opening part, and the first and second shutter electrodes a1 and a2 in the fifth control area B5 are operated as the opening part. Therefore, the left-eye image displayed on the display panel 300 is concentrated in the observer's left-eye Leye so that the observer may observe the left-eye image. In this case, referring to the left-eye incident image RI analyzed based on the observer's position, the observer's left-eye Leye may not observe the left-eye image displayed on the first and second areas 2D_A1 and 2D_A1 of the display panel 300. On the first and second areas 2D_A1 and 2D_A1, the observer may all observe the right-eye image during the first and second sub frames. However, the first and second areas 2D_A1 and 2D_A1 have small rate with respect to an entire active area so that the 3D display apparatus displays the 3D image with no problem.

According to the present exemplary embodiments, when the observer is located a distance nearer than the OVD and the number n of the shutter electrode in the unit part is an odd number, the active area AA of the shutter panel 510 is divided into the control areas based on the observer's position and the concentrating areas at the OVD and the shutter electrodes in each of the control areas are controlled as the right-eye electrode and the left-eye electrode based on the observer's position. According to the present exemplary embodiments, the control areas are determined by the division boundary which is determined by the extension line EL. For example, the extension line EL may connect a center of an area in which the observer's right-eye Reye is located with a center of a connecting line. The connecting line may connect a center of the concentrating area with a boundary of the concentrating area. Therefore, when the observer is located out of the OVD, the observer may observe the 3D image.

Figure 10:
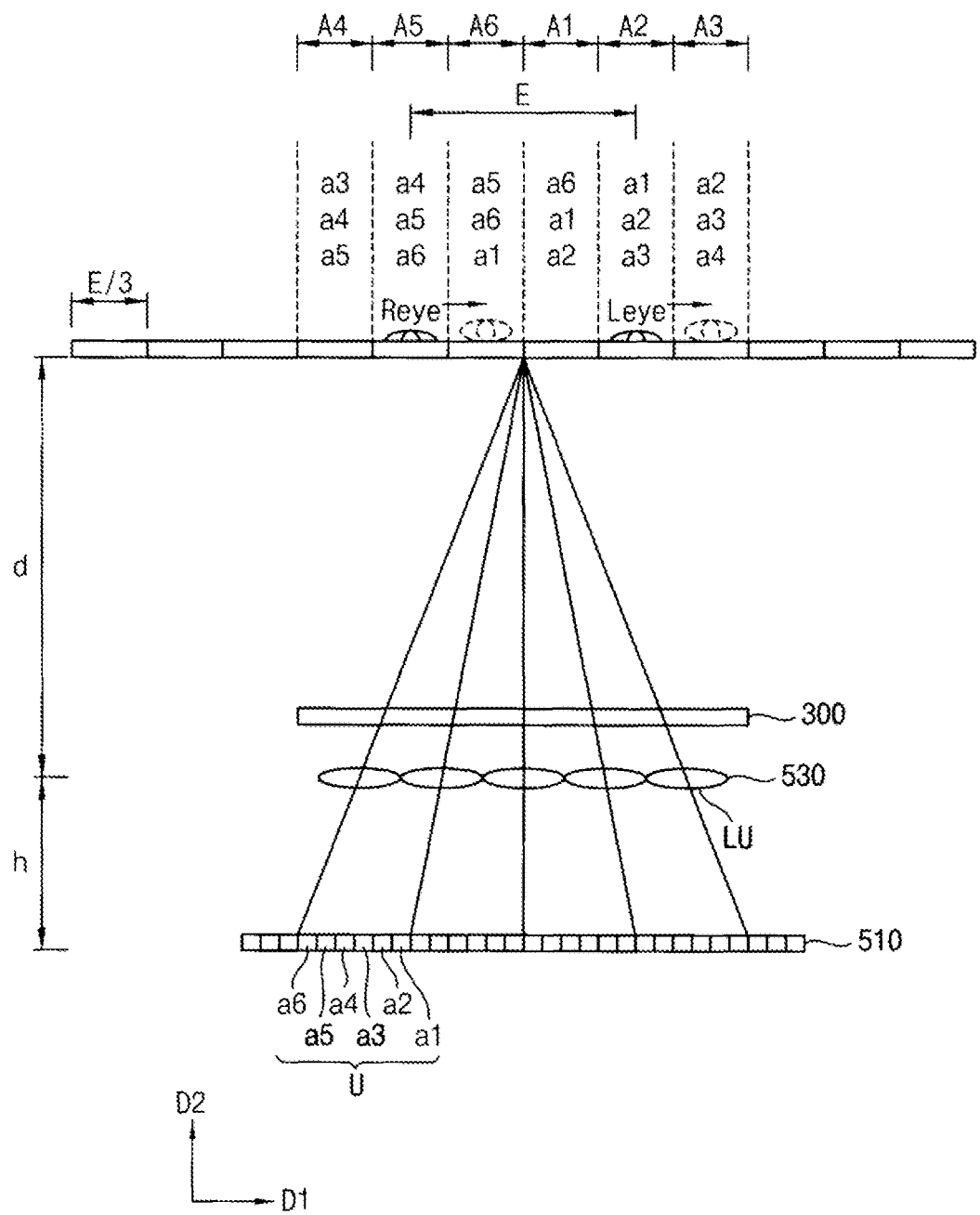
FIG. 10 is a diagram illustrating a method of displaying a 3D image when the observer is located within the OVD using a 3D display apparatus according to exemplary embodiments of the invention.

FIG. 10 is a diagram illustrating a method of displaying a 3D image when the observer is located within the OVD using a 3D display apparatus according to exemplary embodiments of the invention.

Referring to FIG. 10, the 3D display apparatus may include a shutter panel 510. The shutter panel 510 may include a unit part U. The unit part U may include six shutter electrodes which sequentially arranged in a first direction D1 corresponding to one lens LU of the lens plate 530. The unit part U may include a first shutter electrode a1, a second shutter electrode a2, a third shutter electrode a3, a fourth shutter electrode a4, a fifth shutter electrode a5 and a sixth shutter electrode a6.

According to the present exemplary embodiments, the OVD of the observer may be determined by a distance E between the observer's right-eye Reye and the left-eye Leye, a width of the shutter electrode a1 in the first direction D1 and a width of the lens LU in the first direction D1 and a distance h of the shutter panel 510 and the lens plate 530 in a second direction D2 crossing the first direction D1.

As shown in FIG. 10, lights transmitted through of the first, second, third, fourth, fifth and sixth shutter electrodes a1, a2, a3, a4, a5 and a6 operating as the opening part are respectively concentrated in first, second, third, fourth, fifth and sixth concentrating areas A1, A2, A3, A4, A5 and A6 at the OVD. Each of the first, second, third, fourth, fifth and sixth concentrating areas A1, A2, A3, A4, A5 and A6 has a width of about E/3 in the first direction D1.

When the observer is located within the OVD, the control part determines three shutter electrodes as the right-eye electrode and remaining three electrodes as the left-eye electrode based on a position of the observer's right-eye Reye and a position of the observer's left-eye Leye.

As shown in FIG. 10, when the observer's two eyes are located at the OVD, the observer's right-eye Reye is located in the fifth concentrating area A5 at the OVD and the observer's left-eye Leye is located in the second concentrating area A2 at the OVD, the method of driving the shutter panel 510 is explained. In this case, the control part determines the fourth, fifth and sixth shutter electrodes a4, a5 and a6 in the unit part as the right-eye electrode and the remaining first, second and third shutter electrodes a1, a2 and a3 as the left-eye electrode, based on the position of the observer's right-eye Reye. The shutter driving part drives the fourth, fifth and sixth shutter electrodes a4, a5 and a6 as the opening part during the first sub frame during which the display panel 300 displays the right-eye image according to a control of the control part. Thus, the observer's right-eye Reye may observe the right-eye image during the first sub frame. In addition, the shutter driving part drives the first, second and third shutter electrodes a1, a2 and a3 as the opening part during the second sub frame during which the display panel 300 displays the left-eye image according to a control of the control part. Thus, the observer's left-eye Leye may observe the left-eye image during the second sub frame.

Alternatively, when the observer's right-eye Reye is located in the sixth concentrating area A6, the control part determines the first, fifth and sixth shutter electrodes a1, a5 and a6 as the right-eye electrode and the remaining second, third and fourth shutter electrodes a2, a3 and a4 as the left-eye electrode. The shutter driving part drives the first, fifth and sixth shutter electrodes a1, a5 and a6 as the opening part during the first sub frame during which the display panel 300 displays the right-eye image according to a control of the control part. Thus, the observer's right-eye Reye may observe the right-eye image during the first sub frame. In addition, the shutter driving part drives the second, third and fourth shutter electrodes a2, a3 and a4 as the opening part during the second sub frame during which the display panel 300 displays the left-eye image according to a control of the control part. Thus, the observer's left-eye Leye may observe the left-eye image during the second sub frame.

As described above, when the observer is located within the OVD and the unit part corresponding to one lens includes six shutter electrodes, three electrodes of the six shutter electrodes may be operated as the right-eye electrode and the remaining three shutter electrodes may be operated as the left-eye electrode based on the observer's position.

According to the present exemplary embodiments, when the observer is located within the OVD and the number n of the shutter electrode in the unit part is an even number, n/2 shutter electrodes and n/2 shutter electrodes of the n shutter electrodes may be selectively controlled as the left-eye and right-eye electrodes based on the observer's position. Thus, the observer may observe the 3D image.

Figure 11A:
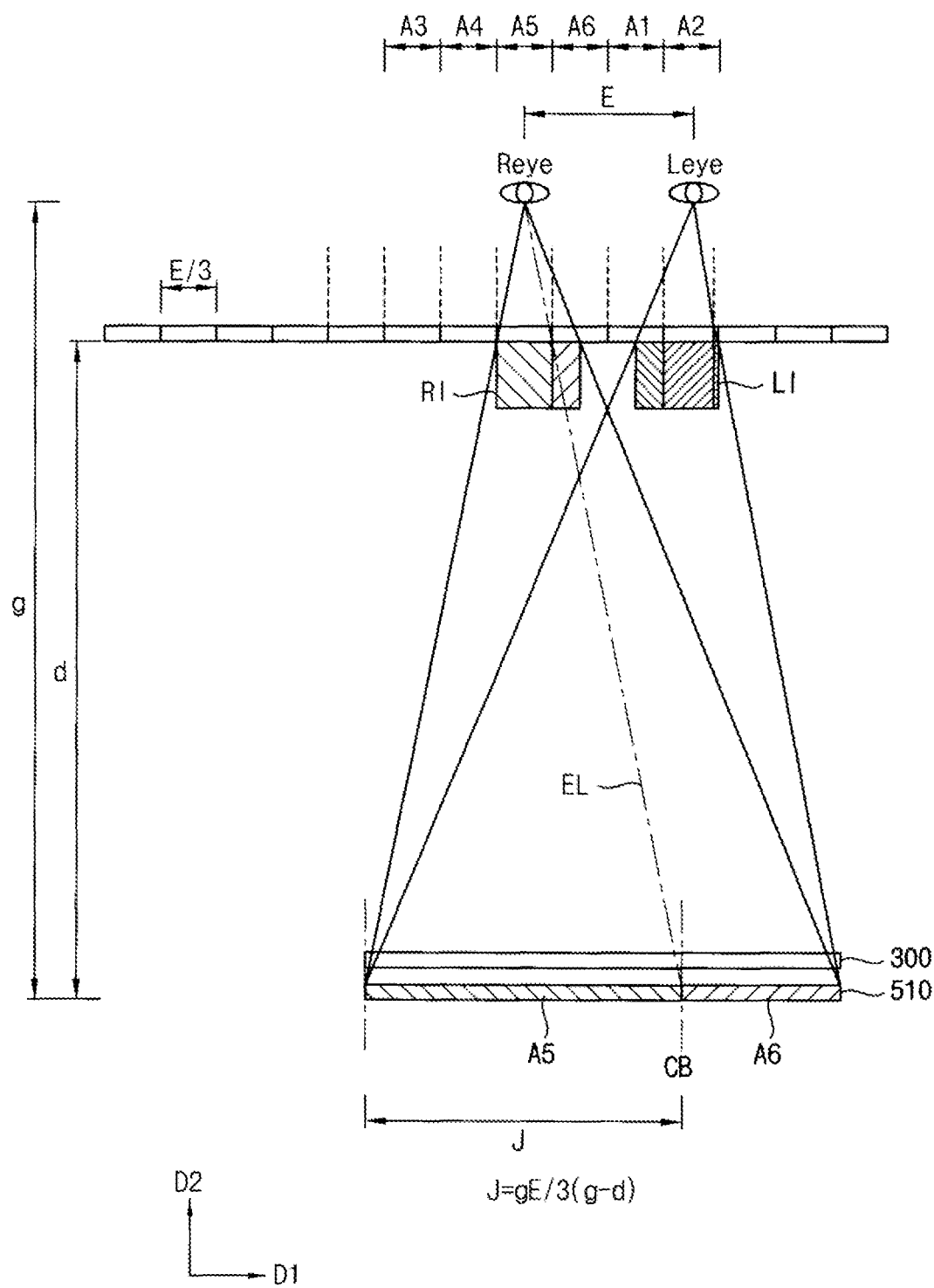

FIGS. 11A and 11B are diagrams illustrating a method of displaying a 3D image when the observer is located further away from the OVD according to the 3D display apparatus as shown in FIG. 10.

Referring to FIGS. 11A and 11B, a method of driving of the shutter panel 510 is explained when the observer is located further away from the OVD, the shutter panel 510 is divided into a plurality of control areas based on a position of the observer, and then the shutter electrodes in each of the control areas are controlled as the left-eye electrode and the right-eye electrode. Hereinafter, as shown in FIG. 11A, when the observer is located at a distance g further away from the OVD, the observer's right-eye Reye is located in an area in parallel with the fifth concentrating area A5 at the OVD and the observer's left-eye Leye is located in an area in parallel with the second concentrating area A2 at the OVD.

The control part analyzes one of the light being incident on the observer's right-eye ("right-eye incident image") RI and light being incident on the observer's left-eye ("left-eye incident image") LI, based on the observer's position m which is located away from the OVD and the first, second, third, fourth, fifth and sixth concentrating areas A1, A2, A3, A4, A5 and A6 at the OVD corresponding to the first, second, third, fourth, fifth and sixth shutter electrodes a1, a2, a3, a4, a5 and a6 as shown in FIG. 10. For example, the control part analyzes the right-eye incident image RI, and then determines a division boundary CB on the shutter panel 510 based on the concentrating areas corresponding to the right-eye incident image RI.

The right-eye incident image RI as shown in FIGS. 10 and 11A includes images corresponding to the light which concentrated in the fifth and sixth concentrating areas A5 and A6 at the OVD. The light transmitted through the fifth shutter electrode a5 operating as the opening part is concentrated in the fifth concentrating area A1. The light transmitted through the sixth shutter electrode a6 operating as the opening part is concentrated in the sixth concentrating area A6. As shown in FIG. 11B, the division boundary CB is determined by an extension line on an active area AA of the shutter panel 510. The extension line connects a center of an area in which the observer's right-eye Reye is located with a boundary of the concentrating area.

The control part divides the active area AA of the shutter panel 510 into first and second control areas B1 and B2 based on the division boundary CB.

The control part determines the shutter electrodes in each of the first and second control areas B1 and B2 as the left-eye electrode and the right-eye electrode based on the right-eye incident image RI. As shown in FIG. 11B, in the first control area B1, the control part determines the fifth shutter electrode a5 based on the fifth concentrating area A5, and the fourth and sixth shutter electrodes a4 and a6 which are disposed adjacent to the fifth shutter electrode a5 as the right-eye electrode. The control part determines the remaining first, second and third shutter electrodes a1, a2 and a3 as the left-eye electrode. In the second control area B2, the control part determines the sixth shutter electrode a6 based on the sixth concentrating area A6, and the first and fifth shutter electrodes a1 and a5 which are disposed adjacent to the sixth shutter electrode a6 as the right-eye electrode. The control part determines the remaining second, third and fourth shutter electrodes a2, a3 and a4 as the left-eye electrode.

During the first sub frame during which the display panel 300 displays the right image, the shutter driving part operates the fourth, fifth and sixth shutter electrodes a4, a5 and a6 in the first control area B1 as the opening part, and operates the first, fifth and sixth shutter electrodes a1, a5 and a6 in the second control area B2 as the opening part. Therefore, the right-eye image is concentrated in the observer's right-eye Reye so that the observer may observe the right-eye image during the first sub frame.

During the second sub frame during which the display panel 300 displays the left image, the shutter driving part operates the first, second and third shutter electrodes a1, a2 and a3 in the first control area B1 as the opening part, and operates the first, second and third shutter electrodes a1, a2 and a3 in the second control area B2 as the opening part. Therefore, the left-eye image is concentrated in the observer's left-eye Reye so that the observer may observe the left-eye image during the second sub frame.

According to the present exemplary embodiments, when the observer is located at distance further away from the OVD, the number of the shutter electrode in the unit part is an even number and n/2 is an odd number, the active area AA of the shutter panel 510 is divided into the control areas based on the division boundary CB and the shutter electrodes in each of the control areas are controlled as the right-eye electrode and the left-eye electrode based on the observer's position. According to the present exemplary embodiments, the division boundary is determined by the extension line EL. The extension line EL connects a center of an area in which the observer's one eye is located with a center of the concentrating area. Therefore, when the observer is located out of the OVD, the observer may observe the 3D image.

Figure 12:
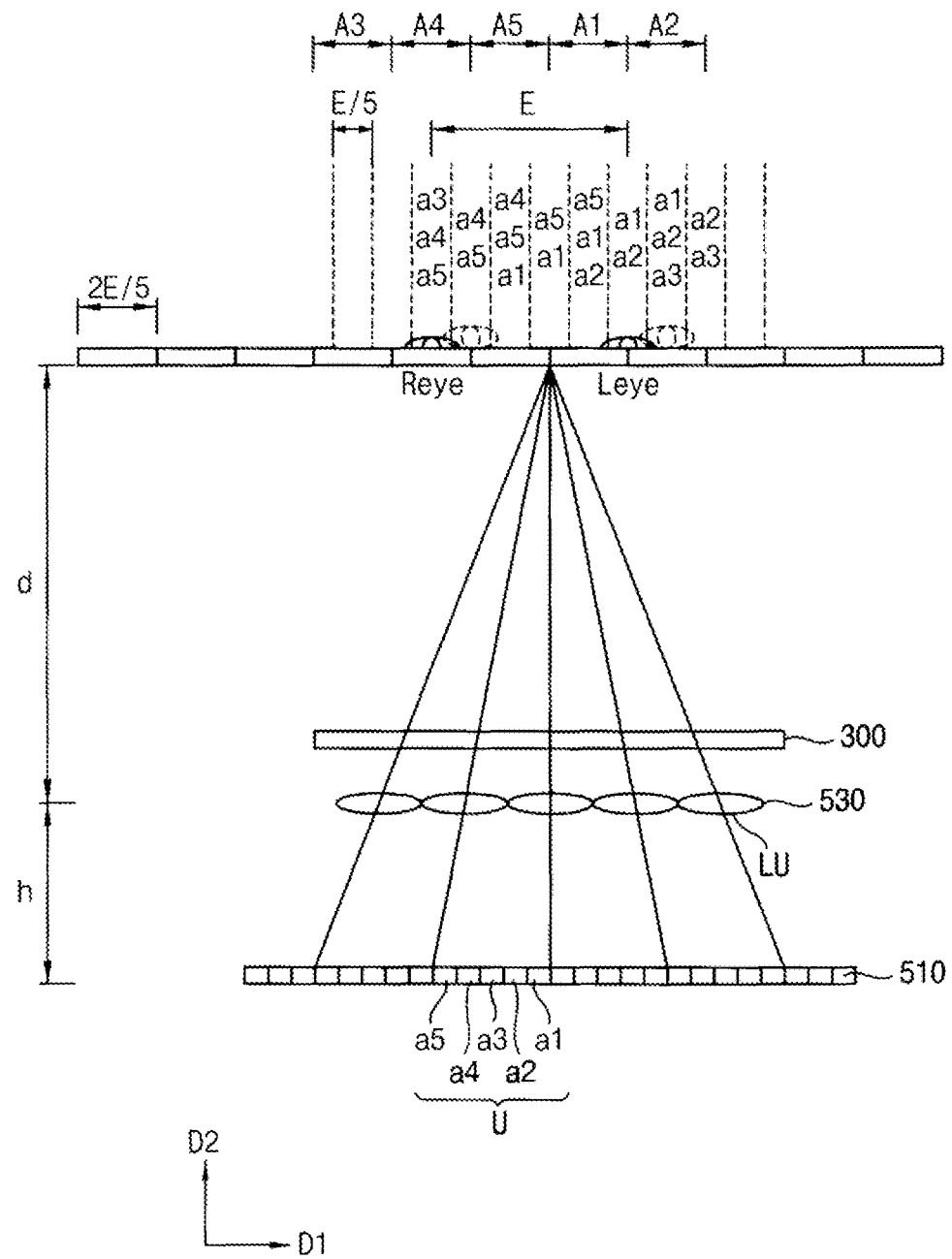
FIG. 12 is a diagram illustrating a method of displaying a 3D image when the observer is located within the OVD using a 3D display apparatus according to exemplary embodiments of the invention.

FIG. 12 is a diagram illustrating a method of displaying a 3D image when the observer is located within the OVD using a 3D display apparatus according to exemplary embodiments of the invention.

Referring to FIG. 12, for example, the 3D display apparatus may include a shutter panel 510. The shutter panel 510 may include a unit part U. The unit part U may include five shutter electrodes which sequentially arranged in a first direction D1 corresponding to one lens LU of the lens plate 530. The unit part U may include a first shutter electrode a1, a second shutter electrode a2, a third shutter electrode a3, a fourth shutter electrode a4 and a fifth shutter electrode a5.

According to the present exemplary embodiment, the OVD of the observer may be determined by a distance E between the observer's right-eye Reye and the left-eye Leye, a width of the shutter electrode a1 in the first direction D1 and a width of the lens LU in the first direction D1 and a distance h of the shutter panel 510 and the lens plate 530 in a second direction D2 crossing the first direction D1.

As shown in FIG. 12, lights transmitted through of the first, second, third, fourth and fifth shutter electrodes a1, a2, a3, a4 and a5 operating as the opening part are respectively concentrated in first, second, third, fourth, fifth and sixth concentrating areas A1, A2, A3, A4 and A5 at the OVD. Each of the first, second, third, fourth and fifth concentrating areas A1, A2, A3, A4 and A5 has a width of about 2E/5 in the first direction D1.

When the observer is located within the OVD, the control part determines three or two shutter electrodes as the right-eye electrode and remaining two or three electrodes as the left-eye electrode based on a position of the observer's right-eye Reye and a position of the observer's left-eye Leye.

As shown in FIG. 12, when the observer's two eyes are located at the OVD, the observer's right-eye Reye is located in the fourth concentrating area A4 and the observer's left-eye Leye is located in a boundary of the first and second concentrating areas A1 and A2, the method of driving the shutter panel 510 is explained. In this case, the control part determines the third, fourth and fifth shutter electrodes a3, a4 and a5 in the unit part as the right-eye electrode and the remaining first and second shutter electrodes a1 and a2 as the left-eye electrode, based on the position of the observer's right-eye Reye. The shutter driving part drives the third, fourth and fifth shutter electrodes a3, a4 and a5 as the opening part during the first sub frame during which the display panel 300 displays the right-eye image according to a control of the control part. Thus, the observer's right-eye Reye may observe the right-eye image during the first sub frame. In addition, the shutter driving part drives the first and second shutter electrodes a1 and a2 as the opening part during the second sub frame during which the display panel 300 displays the left-eye image according to a control of the control part. Thus, the observer's left-eye Leye may observe the left-eye image during the second sub frame.

Alternatively, when the observer's right-eye Reye is located in a boundary of the fourth and fifth concentrating areas A4 and A5, the control part determines the fourth and fifth shutter electrodes a4 and a5 as the right-eye electrode and the remaining first, second and third shutter electrodes a1, a2 and a3 as the left-eye electrode. The shutter driving part drives the fourth and fifth shutter electrodes a4 and a5 as the opening part during the first sub frame during which the display panel 300 displays the right-eye image according to a control of the control part. Thus, the observer's right-eye Reye may observe the right-eye image during the first sub frame. In addition, the shutter driving part drives the first, second and third shutter electrodes a1, a2 and a3 as the opening part during the second sub frame during which the display panel 300 displays the left-eye image according to a control of the control part. Thus, the observer's left-eye Leye may observe the left-eye image during the second sub frame.

As described above, when the observer is located within the OVD and the unit part corresponding to one lens includes five shutter electrodes, three or two electrodes of the five shutter electrodes may be operated as the right-eye electrode and the remaining two or three shutter electrodes may be operated as the left-eye electrode based on the observer's position.

According to the present exemplary embodiments, when the observer is located within the OVD and the number n of the shutter electrode in the unit part is an odd number, (n+1)/2 shutter electrodes and (n+1)/2−1 shutter electrodes of the n shutter electrodes may be selectively controlled as the left-eye and right-eye electrodes based on the observer's position. Thus, the observer may observe the 3D image.

Figure 13A:
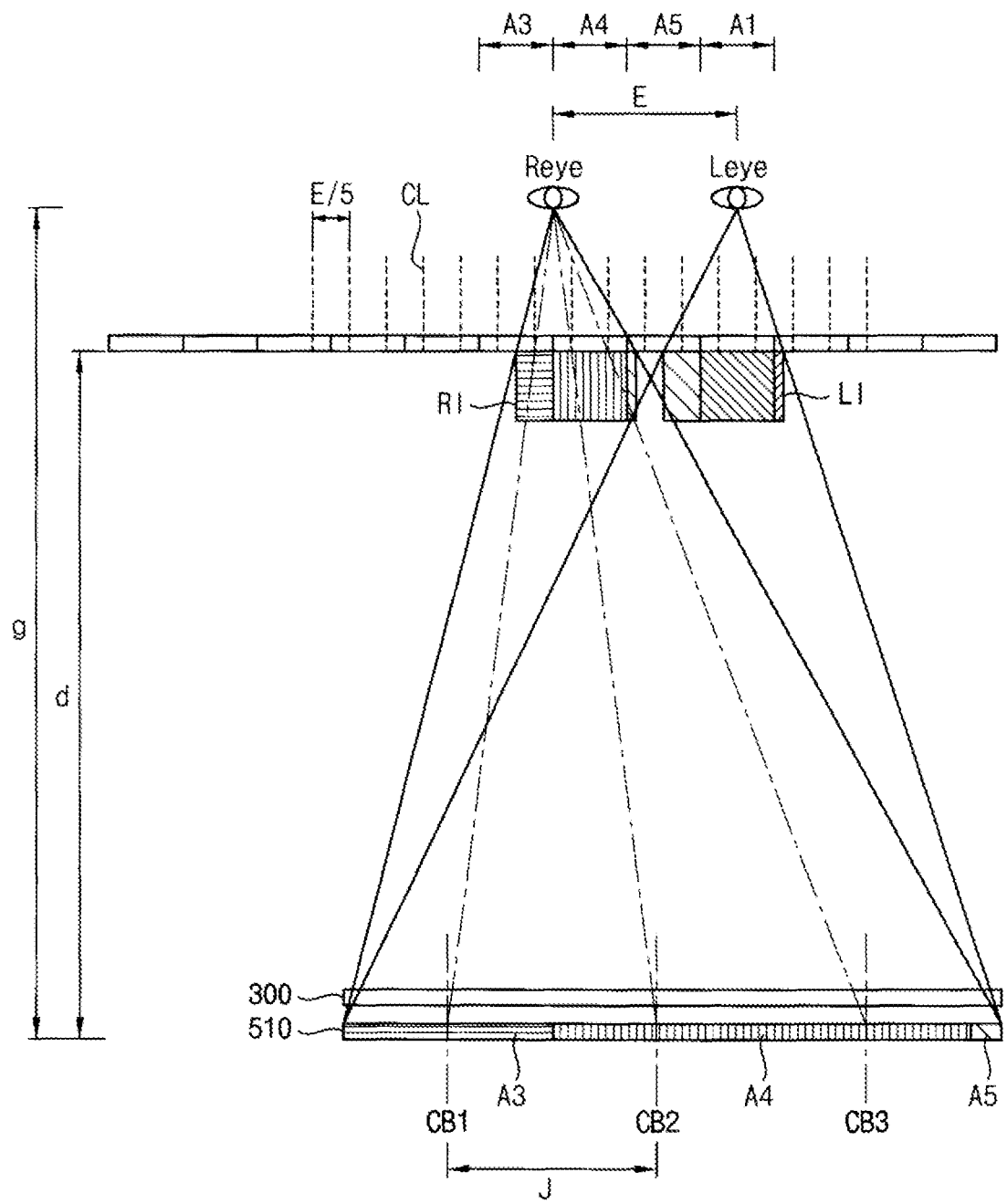

FIGS. 13A and 13B are diagrams illustrating a method of displaying a 3D image when the observer is located further away from the OVD according to the 3D display apparatus as shown in FIG. 12.

Referring to FIGS. 13A and 13B, a method of driving of the shutter panel 510 is explained when the observer is located further away from the OVD, the shutter panel 510 is divided into a plurality of control areas based on a position of the observer, and then the shutter electrodes in each of the control areas are controlled as the left-eye electrode and the right-eye electrode. Hereinafter, as shown in FIG. 12A, when the observer is located at a distance g further away from the OVD, the observer's right-eye Reye is located in an area in parallel with the boundary of the third and fourth concentrating areas A3 and A4 at the OVD and the observer's left-eye Leye is located in an area in parallel with the first concentrating area A1 at the OVD.

The control part analyzes one of the light being incident on the observer's right-eye ("right-eye incident image") RI and light being incident on the observer's left-eye ("left-eye incident image") LI, based on the observer's position m which is located away from the OVD and the first, second, third, fourth and fifth concentrating areas A1, A2, A3, A4 and A5 at the OVD corresponding to the first, second, third, fourth and fifth shutter electrodes a1, a2, a3, a4 and a5 as shown in FIG. 12. For example, the control part analyzes the right-eye incident image RI, and then determines division boundaries CB1, CB2 and CB3 on the shutter panel 510 based on the concentrating areas corresponding to the right-eye incident image RI.

The right-eye incident image RI as shown in FIGS. 12 and 13A includes images corresponding to the light which concentrated in the third, fourth and fifth concentrating areas A3, A4 and A5 and A6 at the OVD. The light transmitted through the third shutter electrode a3 operating as the opening part is concentrated in the third concentrating area A3. The light transmitted through the fourth shutter electrode a4 operating as the opening part is concentrated in the fourth concentrating area A4. The light transmitted through the fifth shutter electrode a5 operating as the opening part is concentrated in the fifth concentrating area A5. As shown in FIG. 13B, the division boundaries CB1, CB2 and CB3 are determined by extension lines on an active area AA of the shutter panel 510. Each of the extension lines EL connects a center of an area in which the observer's right-eye Reye is located with a center CL of a connecting line connecting a center of the concentrating area with a boundary of the concentrating area.

The control part divides the active area AA of the shutter panel 510 into first, second, third and fourth control areas B1, B2, B3 and B4 based on the division boundaries CB1, CB2 and CB3.

The control part determines the shutter electrodes in each of the first, second, third and fourth control areas B1, B2, B3 and B4 as the left-eye electrode and the right-eye electrode as the left-eye and right-eye electrodes based on the right-eye incident image RI. As shown in FIG. 13B, in the first control area B1, the control part determines the third shutter electrode a3 based on the third concentrating area A3, and the second and fourth shutter electrodes a2 and a4 which are disposed adjacent to the third shutter electrode a3 as the right-eye electrode. The control part determines the remaining first, second and fifth shutter electrodes a1, a2 and a5 as the left-eye electrode. In the second control area B2, the control part determines the third and fourth shutter electrode a3 and a4 based on the third and fourth concentrating areas A3 and A4 as the right-eye electrode. The control part determines the remaining first, second and fifth shutter electrodes a1, a2 and a5 as the left-eye electrode. In the third control area B3, the control part determines the fourth shutter electrode a4 based on the fourth concentrating area A4, and the third and fifth shutter electrodes a3 and a5 which are disposed adjacent to the fourth shutter electrode a4 as the right-eye electrode. The control part determines the remaining first and second shutter electrodes a1 and a2 as the left-eye electrode. In the fourth control area B4, the control part determines the fourth and fifth shutter electrode a4 and a5 based on the fourth and fifth concentrating areas A4 and A5 as the right-eye electrode. The control part determines the remaining first, second and third shutter electrodes a1, a2 and a3 as the left-eye electrode.

During the first sub frame during which the display panel 300 displays the right image, the shutter driving part operates the second, third and fourth shutter electrodes a2, a3 and a4 in the first control area B1 as the opening part, operates the third and fourth shutter electrodes a3 and a4 in the second control area B2 as the opening part, operates the third, fourth and fifth shutter electrodes a3, a4 and a5 in the third control area B3 as the opening part, and operates the fourth and fifth shutter electrodes a4 and a5 in the fourth control area B4 as the opening part. Therefore, the right-eye image is concentrated in the observer's right-eye Reye so that the observer may observe the right-eye image during the first sub frame.

During the second sub frame during which the display panel 300 displays the left image, the shutter driving part operates the first and fifth shutter electrodes a1 and a5 in the first control area B1 as the opening part, operates the first, second and fifth shutter electrodes a1, a2 and a5 in the second control area B2 as the opening part, operates the first and second shutter electrodes a1 and a2 in the third control area B3 as the opening part, and operates the first, second and third shutter electrodes a1, a2 and a3 in the fourth control area B4 as the opening part. Therefore, the left-eye image is concentrated in the observer's left-eye Reye so that the observer may observe the left-eye image during the second sub frame.

According to the present exemplary embodiments, when the observer is located at distance further away from the OVD and the number of the shutter electrode in the unit part is an odd number, the active area AA of the shutter panel 510 is divided into the control areas based on the division boundary and the shutter electrodes in each of the control areas are controlled as the right-eye electrode and the left-eye electrode based on the observer's position. According to the present exemplary embodiment, the division boundary is determined by the extension line EL. The extension line EL connects a center of an area in which the observer's right-eye Reye is located with a center CL of a connecting line connecting a center of the concentrating area with a boundary of the concentrating area. Therefore, when the observer is located out of the OVD, the observer may observe the 3D image.

Figure 14:
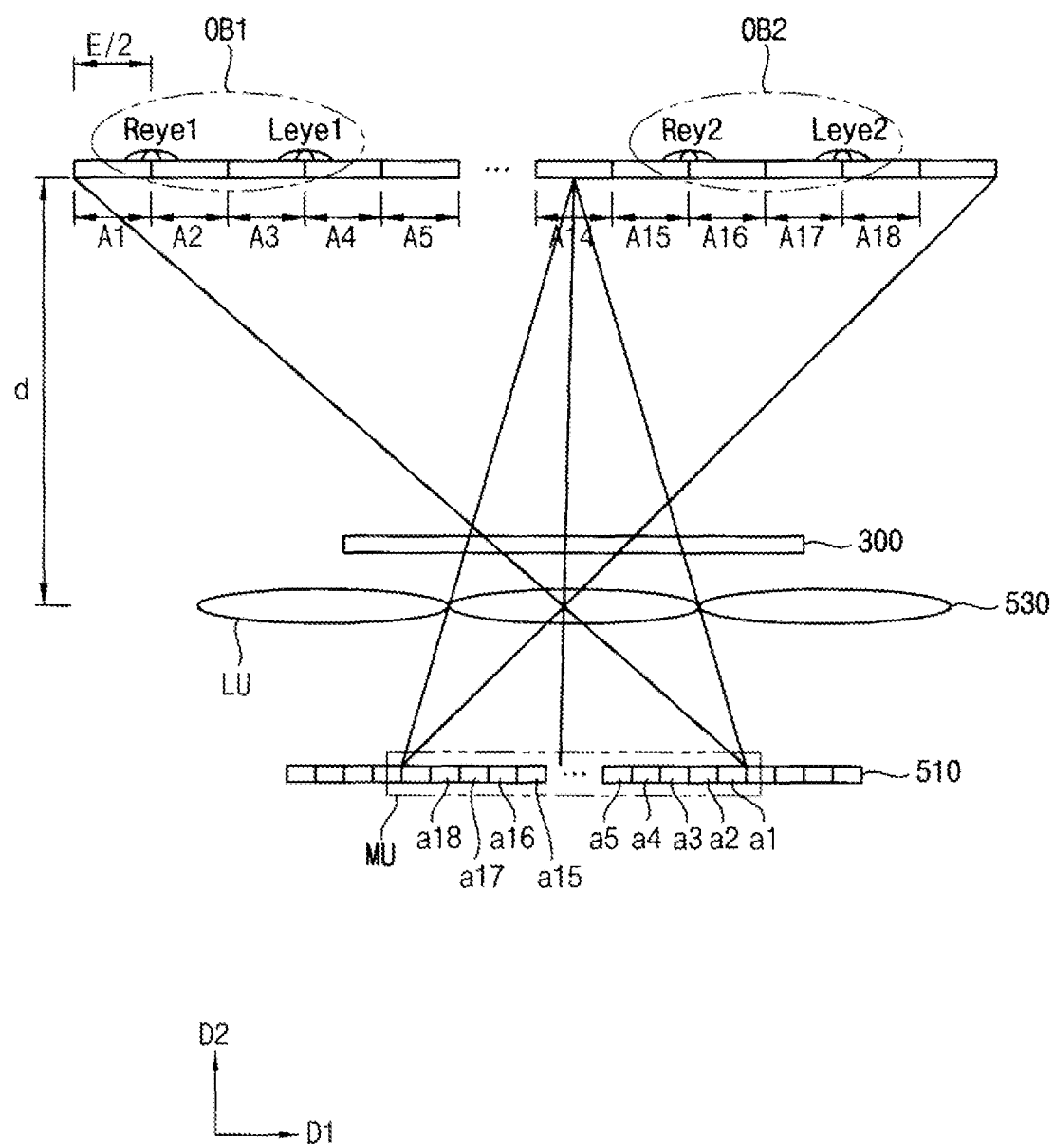
FIG. 14 is a diagram illustrating a 3D display apparatus according to exemplary embodiments of the invention.

FIG. 14 is a diagram illustrating a 3D display apparatus according to exemplary embodiments of the invention.

Referring to FIG. 14, a plurality of observers may observe the 3D image through the 3D display apparatus according to the present exemplary embodiments.

The 3D display apparatus may include a shutter panel 510. The shutter panel 510 may include a multi-unit part MU. The multi-unit part MU may include m shutter electrodes which sequentially arranged in a first direction D1 corresponding to one lens LU of the lens plate 530. Herein, m is a natural number. The multi-unit part MU may include plurality of unit parts corresponding to the plurality of observers. Each of the unit part may include four shutter electrodes which sequentially arranged in the first direction D1. Thus, 'm' may be more than a number multiplying the number of the observer by four being the number of the shutter electrode in the unit part.

According to the present exemplary embodiments, the OVD of the observer may be determined by a distance E between the observer's right-eye Reye and the left-eye Leye, a width of the shutter electrode a1 in the first direction D1 and a width of the lens LU in the first direction D1 and a distance of the shutter panel 510 and the lens plate 530 in a second direction D2 crossing the first direction D1.

As shown in FIG. 14, lights transmitted through of m shutter electrodes in the multi-unit part MU are respectively concentrated in m concentrating areas at the OVD. Each of the concentrating areas has a width of about E/2 in the first direction D1. For example, when a first observer OB1 is located in first, second, third and fourth concentrating areas A1, A2, A3 and A4 at the OVD corresponding to first, second, third and fourth shutter electrodes a1, a2, a3, and a second observer OB2 is located in fifteenth, sixteenth, seventeenth and eighteenth concentrating areas A15, A16, A17 and A18 at the OVD corresponding to fifteenth, sixteenth, seventeenth and eighteenth shutter electrodes a15, a16, a17 and a18, the method of driving the shutter panel 510 is explained.

When the first and second observers OB1 and OB2 are located within the OVD, the method of driving the shutter panel 510 according to the observer's position is substantially the same method described in FIG. 4. Thus, the method of driving the shutter panel 510 according to the present exemplary embodiment is briefly explained.

As shown in FIG. 14, when the first observer's right-eye Reye1 is located in a boundary of the first and second concentrating areas A1 and A2 and the second observer's right-eye Reye2 is located in a boundary of the fifteenth and sixteenth concentrating areas A15 and A16, the control part determines the first, second, fifteenth and sixteenth shutter electrodes a1, a2, a15 and a16 of m shutter electrodes in the multi-unit part as the right-eye electrode and the remaining shutter electrodes a3, a4, . . . , a17, a18, . . . of m shutter electrodes as the left-eye electrode.

Alternatively, when the first observer's right-eye Reye1 is located in a boundary of the second and third concentrating areas A2 and A3 and the second observer's right-eye Reye2 is located in a boundary of the fourteenth and fifteenth concentrating areas A14 and A15, the control part determines the second, third, fourteenth and fifteenth shutter electrodes a2, a3, a14 and a15 of m shutter electrodes as the right-eye electrode, and the remaining electrodes a4, a5, a16, a17, . . . of m shutter electrodes as the left-eye electrode.

As described above, m shutter electrodes in the multi-unit part MU may be selectively operated as the left-eye electrode and right-eye electrode based on positions the observers so that the observers may be observe the 3D image.

Figure 15:
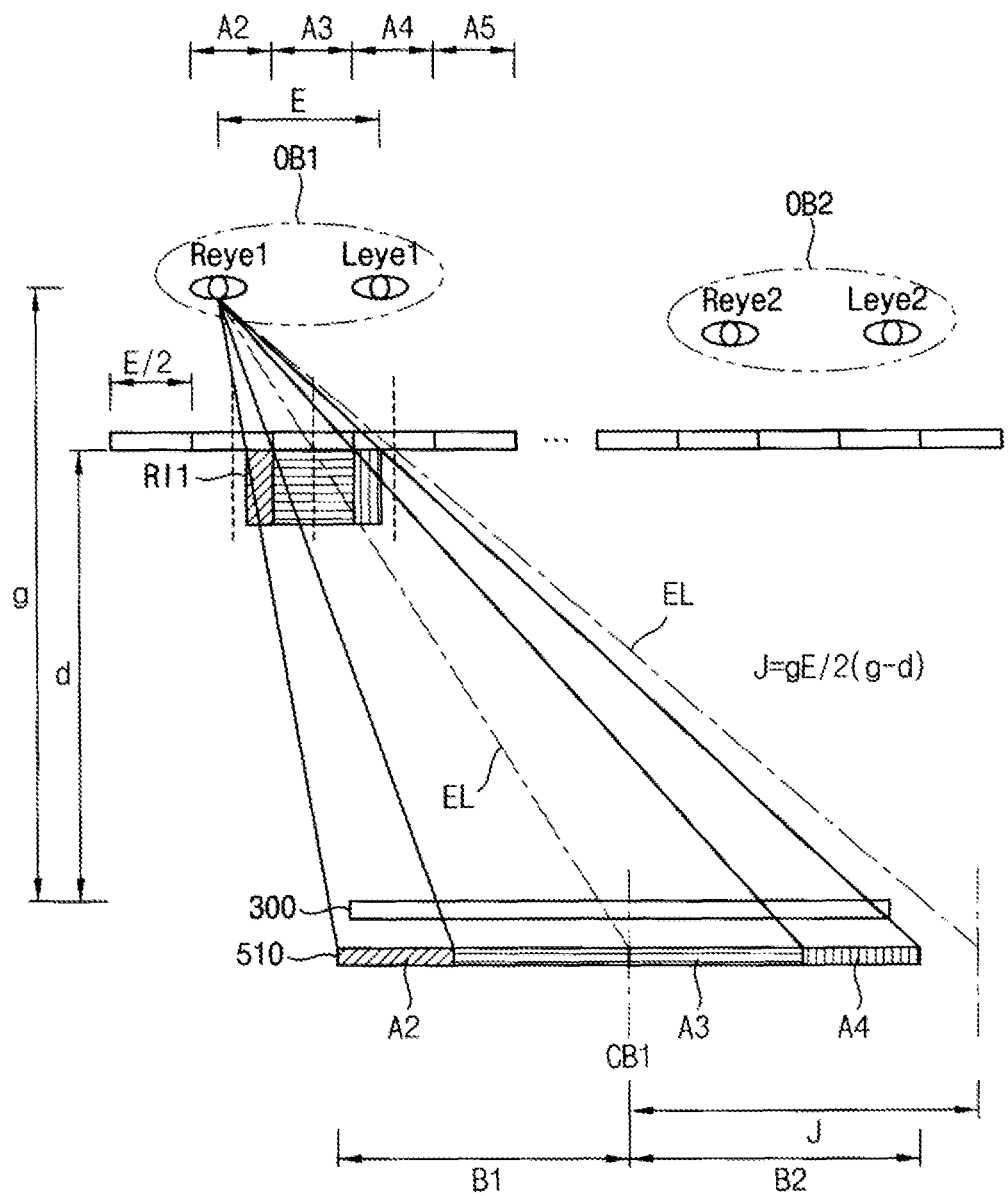
FIG. 15 is a diagram illustrating a method of displaying a 3D image when a first observer is located further away from the OVD as shown in FIG. 14.
Figure 16:
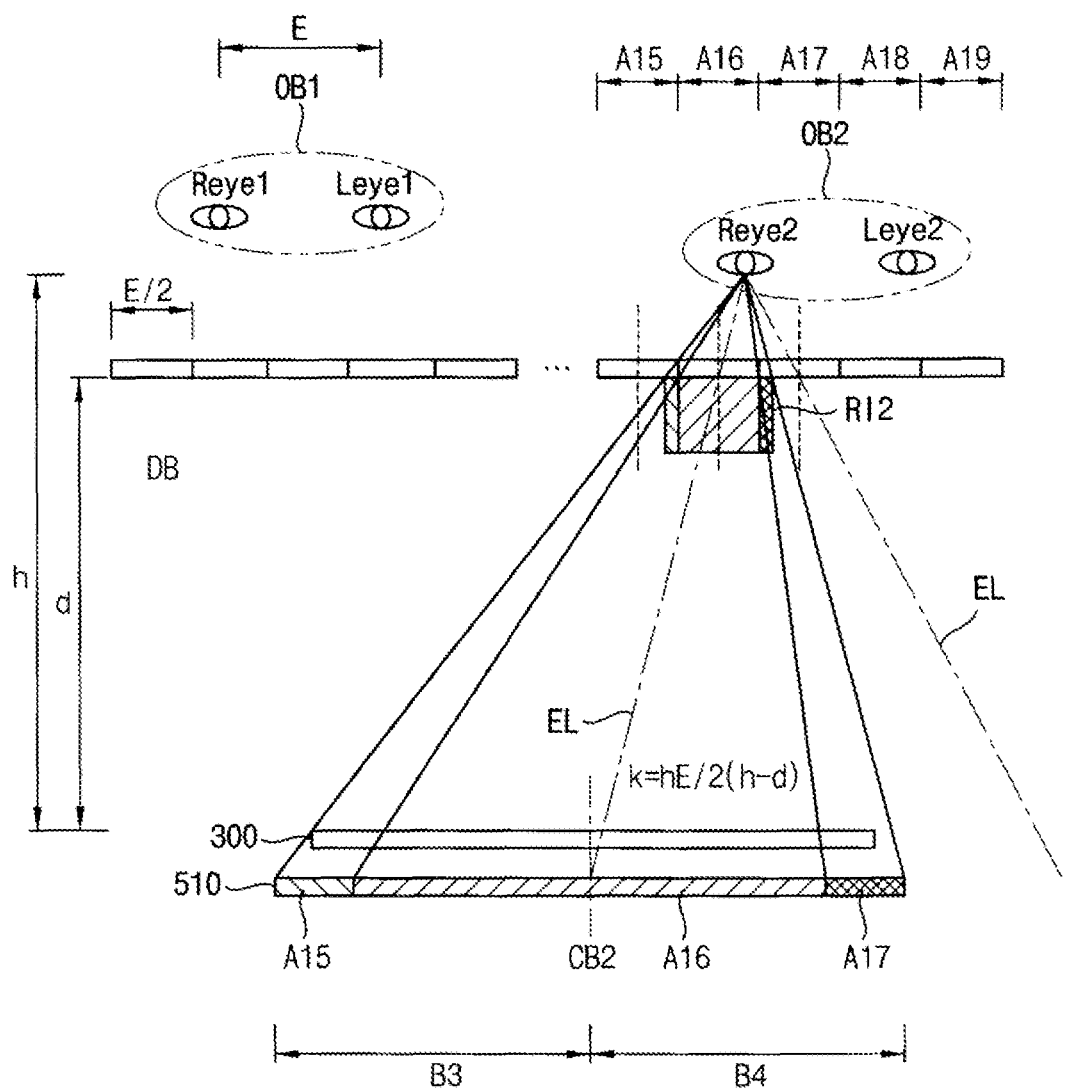
FIG. 16 is a diagram illustrating a method of displaying a 3D image when a second observer is located further away from the OVD as shown in FIG. 14.

FIG. 15 is a diagram illustrating a method of displaying a 3D image when a first observer is located further away from the OVD as shown in FIG. 14. FIG. 16 is a diagram illustrating a method of displaying a 3D image when a second observer is located further away from the OVD as shown in FIG. 14. According to the present exemplary embodiments, method of driving the shutter panel is substantially the same method described in FIGS. 5A and 5B and is briefly explained when the first and second observers are located further away from the OVD.

Referring to FIGS. 15 and 16, the control part analyzes a first right-eye incident image RI1 which is incident on the first observer's right-eye Reye1 based on position of the first observer's right-eye Reye1, and analyzes a second right-eye incident image RI2 which is incident on the second right-eye incident image RI2 based on position of the second observer's right-eye Reye2.

For example, as shown in FIG. 15, the first right-eye incident image RI1 may include an image corresponding to the second concentrating area A2, the third concentrating area A3 and the fourth concentrating area A4. The control part determines a first division boundary CB1 on the shutter panel 510 by an extension line EL which connects a center of an area in which the first observer's right-eye Reye1 is located with a center of the concentrating area. The control part divides the active area of the shutter panel 510 into first and second control areas B1 and B2 based on the first division boundary CB1 and determines the shutter electrodes in each of the first and second control areas B1 and B2 as the right-eye electrode and the left-eye electrode.

Referring to the first right-eye incident image IR1 as shown in FIG. 15, the right-eye electrode is determined as the second and third shutter electrodes a2 and a3 in the first control area B1, and as the third and fourth shutter electrodes a3 and a4 in the second control area B2. The left-eye electrode is determined as the first and fourth shutter electrodes a4 and a5 in the first control area B1 and as the fifth and sixth shutter electrodes a5 and a6 in the second control area B2.

For example, as shown in FIG. 16, the second right-eye incident image RI2 includes an image corresponding to the fifteenth concentrating area A15, the sixteenth concentrating area A16 and the seventeenth concentrating area A17. The control part determines a second division boundary CB2 on the shutter panel 510 by an extension line EL which connects a center of an area in which the second observer's right-eye Reye2 is located with a center of the concentrating area. The control part divides the active area of the shutter panel 510 into third and fourth control areas B3 and B4 based on the second division boundary CB2 and determines the shutter electrodes in each of the third and fourth control areas B3 and B4 as the right-eye electrode and the left-eye electrode.

Referring to the second right-eye incident image IR2 as shown in FIG. 16, the right-eye electrode is determined as the fifteenth and sixteenth shutter electrodes a15 and a16 in the third control area B3, and as the sixteenth and seventeenth shutter electrodes a16 and a17 in the fourth control area B4. The left-eye electrode is determined as the seventeenth and eighteenth shutter electrodes a17 and a18 in the third control area B3 and as the eighteenth and nineteenth shutter electrodes a18 and a19 in the fourth control area B4.

As described above, m shutter electrodes in the multi-unit part MU may be selectively operated as the left-eye electrode and right-eye electrode based on positions the observers so that the observers may be observe the 3D image.

Figure 17:
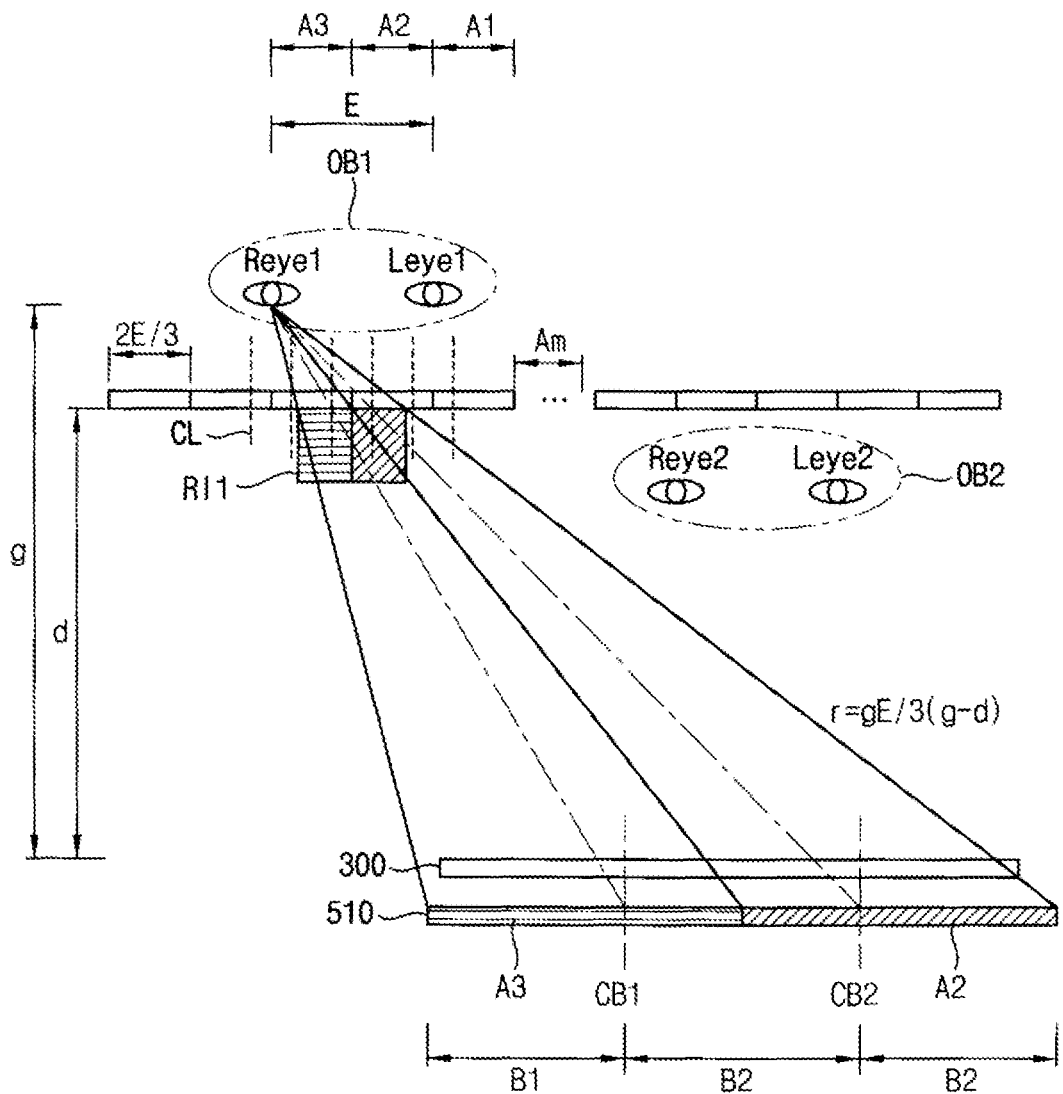
FIGS. 17 and 18 are diagrams illustrating a method of displaying a 3D image according to positions of a plurality of observers.
Figure 18:
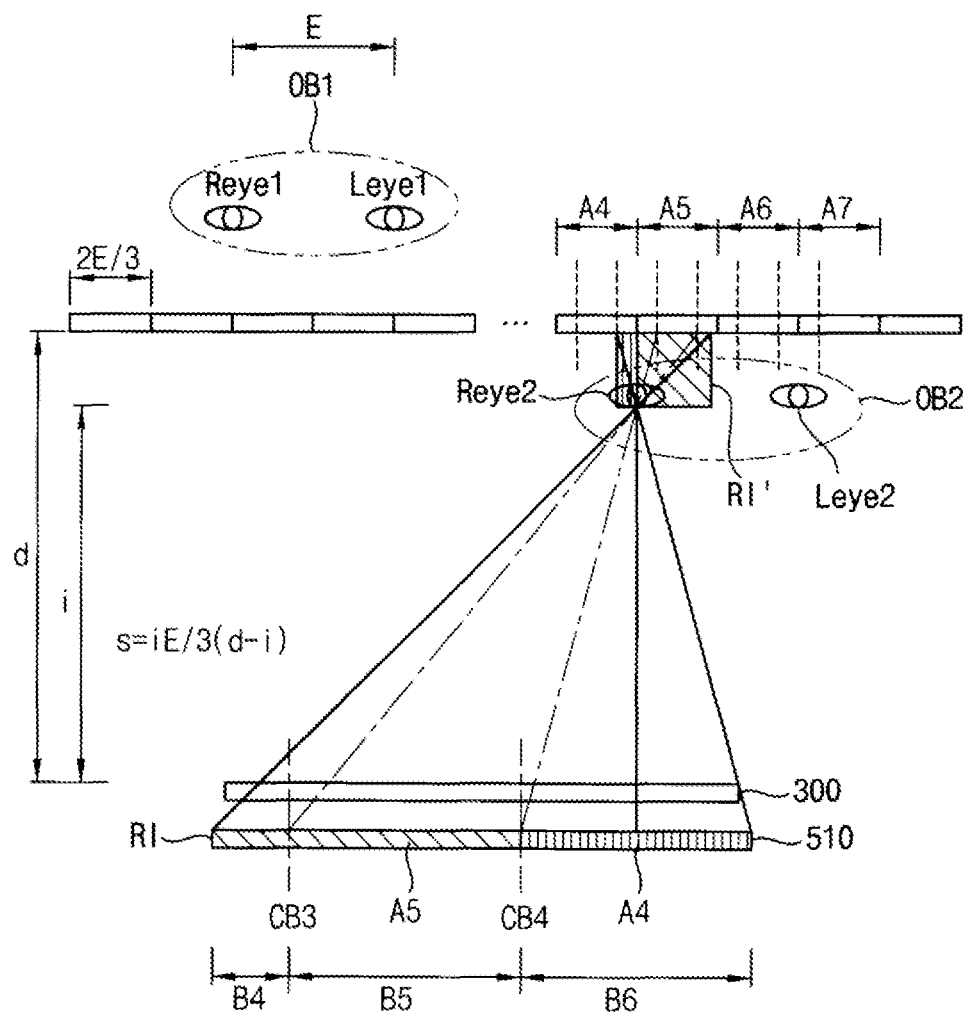

FIGS. 17 and 18 are diagrams illustrating a method of displaying a 3D image according to positions of a plurality of observers. According to the present exemplary embodiments, when a first observer is located further away from the OVD and a second observer is located nearer than the OVD, the method of driving the shutter panel is substantially the same method described in FIGS. 5A, 5B, 9A and 9B and is briefly explained.

Referring to FIGS. 17 and 18, according to the present exemplary embodiments, the 3D display apparatus may include a shutter panel 510. The shutter panel 510 may include a multi-unit part MU. The multi-unit part MU includes m shutter electrodes which sequentially arranged in a first direction D1 corresponding to one lens LU of the lens plate 530. Herein, m is a natural number. The multi-unit part MU may include plurality of unit parts corresponding to the plurality of observers. Each of the unit part includes three shutter electrodes which sequentially arranged in the first direction D1. Thus, 'm' may be more than a number multiplying the number of the observer by three being the number of the shutter electrode in the unit part.

According to the present exemplary embodiments, method of driving the shutter panel is explained when a first observer is located further away from the OVD and a second observer is located nearer than the OVD.

The control part analyzes a first right-eye incident image RI1 which is incident on the first observer's right-eye Reye1 based on position of the first observer's right-eye Reye1, and analyzes a second right-eye incident image RI2 which is incident on the second right-eye incident image RI2 based on position of the second observer's right-eye Reye2.

For example, as shown in FIG. 17, the first right-eye incident image RI1 may include an image corresponding to the second concentrating area A2 and the third concentrating area A3. The control part determines first and second division boundaries CB1 and CB2 on the shutter panel 510 by extension lines EL. Each of the extension lines EL connects a center of an area in which the first observer's right-eye Reye1 is located with a center of a connecting line which connects a center of the concentrating area and a boundary of the concentrating area. The control part divides the active area of the shutter panel 510 into first, second and third control areas B1, B2 and B3 based on the first and second division boundaries CB1 and CB2 and determines the shutter electrodes in each of the first, second and third control areas B1, B2 and B as the right-eye electrode and the left-eye electrode.

Referring to the first right-eye incident image IR1 as shown in FIG. 17, the right-eye electrode is determined as the third shutter electrode a3 in the first control area B1, as the second and third electrodes a2 and a3 in the second control area B2, and as the second shutter electrode a2 in the third control area B3. The left-eye electrode is determined as the first and second shutter electrodes a1 and a2 in the first control area B1, as the first electrode a1 in the second control area B2 and as the first electrode a1 and the an m-th electrode am adjacent to the first shutter electrode to a rightward direction in the third control area B3.

As shown in FIG. 18, the right-eye incident image RI being incident on the second observer's right-eye Reye2 located nearer than the OVD is a bilateral symmetry with respect to a right-eye incident image RI' being incident on an observer's right-eye located at the OVD.

For example, as shown in FIG. 18, the second right-eye incident image RI2 may include an image corresponding to the fourth and fifth concentrating area A4 and A5. The control part determines third and fourth division boundaries CB3 and CB4 on the shutter panel 510 by extension lines EL. Each of the extension lines EL connects a center of an area in which the second observer's right-eye Reye2 is located with a center of a connecting line connecting a center of the concentrating area and a boundary of the concentrating area. The control part divides the active area of the shutter panel 510 into fourth, fifth and sixth areas B4, B5 and B6 based on the third and fourth division boundaries CB3 and CB4. The control part determines the shutter electrodes in each of the fourth, fifth and sixth areas B4, B5 and B6 as the right-eye electrode and the left-eye electrode.

Referring to the second right-eye incident image IR2 as shown in FIG. 18, the right-eye electrode is determined as the fifth and sixth shutter electrodes a5 and a6 in the fourth control area B4, as the fifth electrode a5 in the fifth control area B5, and as the fourth and fifth electrodes a4 and a5 in the sixth control area B6. The left-eye electrode is determined as the seventh shutter electrode a7 in the fourth control area B4, as the sixth and seventh shutter electrodes a6 and a7 in the fifth control area B5, and as the sixth electrode a6 in the sixth control area B6.

As described above, m shutter electrodes in the multi-unit part MU may be selectively operated as the left-eye electrode and right-eye electrode based on positions the observers so that the observers may be observe the 3D image.

Hereinafter, the same reference numerals will be used to refer to the same or like parts as those described in the previous example embodiment, and any repetitive detailed explanation will be omitted to avoid unnecessarily obscuring the present invention.

Figure 19:
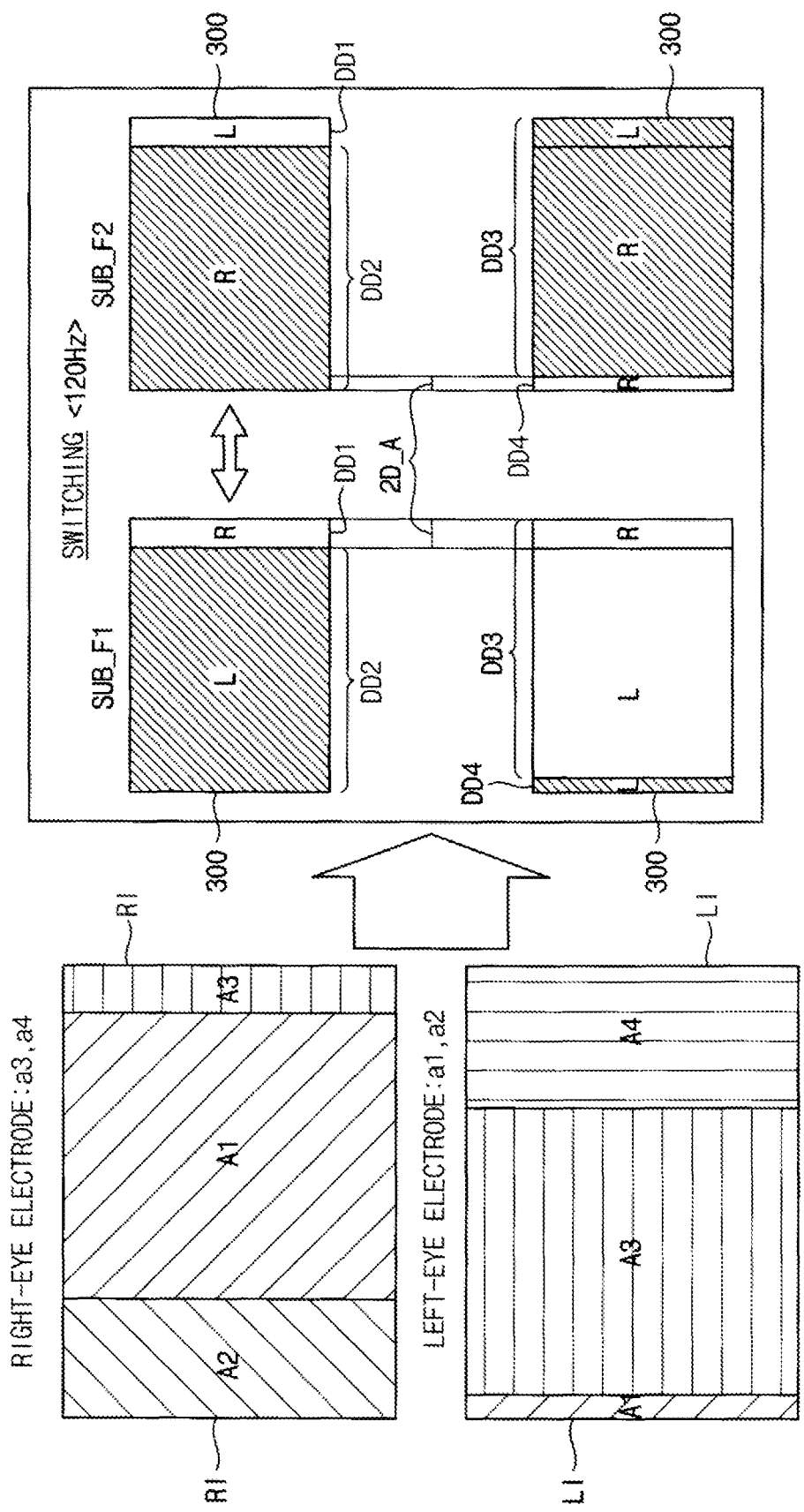
FIG. 19 is a diagram illustrating a 3D display apparatus according to exemplary embodiments of the invention.

FIG. 19 is a diagram illustrating a 3D display apparatus according to exemplary embodiments of the invention.

Referring to FIGS. 1 and 19, the 3D display apparatus according to the present exemplary embodiments may include a shutter panel which includes shutter electrodes fixed as the right-eye electrode and the left-eye electrode. The 3D display apparatus according to the present exemplary embodiments selectively displays a left-eye image and a right-eye image on a display block of the display panel 300 based on an observer's position. The display panel 300 is divided into at least one display block based on the incident image being incident on the observer's one eye.

The control part 100 analyzes the incident image being incident on the observer's one eye and divides an active area of the display panel 300 into a plurality of display blocks based on incident image. The control part 100 controls the display driving part 400 to selectively display the left-eye image and the right image on the display blocks of the display panel 300. However, the control part 100 controls the shutter driving part 600 to operate the predetermined shutter electrodes as the right-eye electrode and the right-eye electrode without reference to the observer's position. For example, during the first sub frame, partially shutter electrodes of the unit part which are predetermined as the right-eye electrode are operated as the opening part. And then, during the second sub frame, remaining shutter electrodes of the unit part which are predetermined as the left-eye electrode are operated as the opening part.

Hereinafter, the method of displaying the 3D image by controlling the left-eye image and the right-eye image displayed on the display panel based on the observer's position is explained.

Referring to FIGS. 4, 5A, 5B and 19, the 3D display apparatus may include the shutter panel 510 as shown in FIG. 4. The shutter panel 510 may include a unit part U having four shutter electrodes, which are sequentially arranged, corresponding to one lens LU. The unit part may include a first shutter electrode a1, a second shutter electrode a2, a third shutter electrode a3 and a fourth shutter electrode a4. According to the present exemplary embodiments, the first and second shutter electrodes a1 and a2 are predetermined as the left-eye electrode and the third and fourth shutter electrodes a3 and a4 are predetermined as the right-eye electrode.

For example, when the observer is located further away from the OVD, the method of displaying the left-eye image and the right-eye image on the display panel is explained.

As described in FIG. 5A, when the observer's right-eye Reye is located in an area which is in parallel with a boundary area of the first and second concentrating areas A1 and A2 at the OVD and the observer's left-eye is located in an area which is in parallel with a boundary area of the third and fourth concentrating areas A3 and A4 at the OVD, the control part analyzes the right-eye incident image RI based on the observer's position.

The right-eye incident image RI includes image corresponding to the light which concentrated in the first, second and third concentrating areas A1, A2 and A3 as shown in FIG. 5A. The light transmitted through the first shutter electrode a1 operating as the opening part is concentrated in the first concentrating area A1. The light transmitted through the second shutter electrode a2 operating as the opening part is concentrated in the second concentrating area A2. The light transmitted through the third shutter electrode a3 operating as the opening part is concentrated in the third concentrating area A3.

During the first sub frame SUB_F1, the third and fourth shutter electrodes a3 and a4 of the shutter panel are operated as the opening part and the remaining first and second shutter electrodes a1 and a2 are operated as the blocking part.

In the first sub frame SUB_F1, the display driving part 400 displays the right-eye image R on a first display block DD1 of the display panel 300 corresponding to the third concentrating area A3 of the right-eye incident image RI and displays the left-eye image L on a second display block DD2 of the display panel 300 corresponding to the first and second concentrating areas A1 and A2 of the right-eye incident image RI.

Therefore, the observer's right-eye Reye observes the right-eye image R displayed on the first display block DD1 and does not observe the left-eye image L displayed on the second display block DD2.

In this case, referring to the left-eye incident image LI, the observer's left-eye Leye observes the left-eye image L and the right-eye image R displayed on the third display block DD3 which corresponds to the third and fourth concentrating areas A3 and A4 by the third and fourth shutter electrodes a3 and a4 of the right-eye electrode, which are operated as the opening part. However, the observer's left-eye Leye does not observe the left-eye image L displayed on a fourth display block DD4 which corresponds to the first concentrating area A1 by the first shutter electrode a1 of the left-eye electrode.

Therefore, during the first sub frame, the observer's right-eye Reye observes the right-eye image R displayed on the first display block DD1 and the observer's left-eye Leye observes the left-eye and right-eye images L and R displayed on the third display block DD3. Thus, the right-eye image R of the first display block DD1 is all observed to the observer's two eyes so that a two-dimensional ("2D") image may be observed on the first display block DD1.

Then, during the second sub frame SUB_F2, the first and second shutter electrodes a1 and a2 of the shutter panel are operated as the opening part and the remaining third and fourth shutter electrodes a3 and a4 are operated as the blocking part.

In the second sub frame SUB_F2, the display driving part 400 displays the right-eye image R on the second display block DD2 of the display panel 300 corresponding to the first and second concentrating areas A1 and A2 of the right-eye incident image RI and displays the left-eye image L on the first display block DD1 of the display panel 300 corresponding to the third concentrating areas A3 of the right-eye incident image RI.

Therefore, the observer's right-eye Reye observes the right-eye image R displayed on the second display block DD2 and does not observe the left-eye image L displayed on the first display block DD1.

In this case, referring to the left-eye incident image LI, the observer's left-eye Leye observes the right-eye image R displayed on the fourth display block DD4 which corresponds to the first concentrating area A1 by the first shutter electrode a1 of the left-eye electrode. However, the observer's left-eye Leye does not observe the right-eye and left-eye images R and L displayed on the third display block DD3 which corresponds to the third and fourth concentrating areas A3 and A4 by the third and fourth shutter electrodes a3 and a4 of the right-eye electrode.

Therefore, during the second sub frame, the observer's right-eye Reye observes the right-eye image R displayed on the second display block DD2 and the observer's left-eye Leye observes the right-eye image R displayed on the fourth display block DD4. Thus, the right-eye image R of the fourth display block DD4 is all observed to the observer's two eyes so that the 2D image may be observed on the fourth display block DD4.

According to the present exemplary embodiments, the control part may display a preset image on the first and fourth display blocks DD1 and DD4 on which the 2D image is observed. The preset image may be a black image. For example, the display driving part 400 displays the black image on the first display block DD1 during the first sub frame SUB_F1 and on the fourth display block DD4 during the second sub frame SUB_F2. Thus, the display quality of the 3D image may be improved.

As described above, the left-eye and right-eye images displayed on the display panel are controlled by the display block based on the observer's position so that the 3D image may be displayed.

Figure 20:
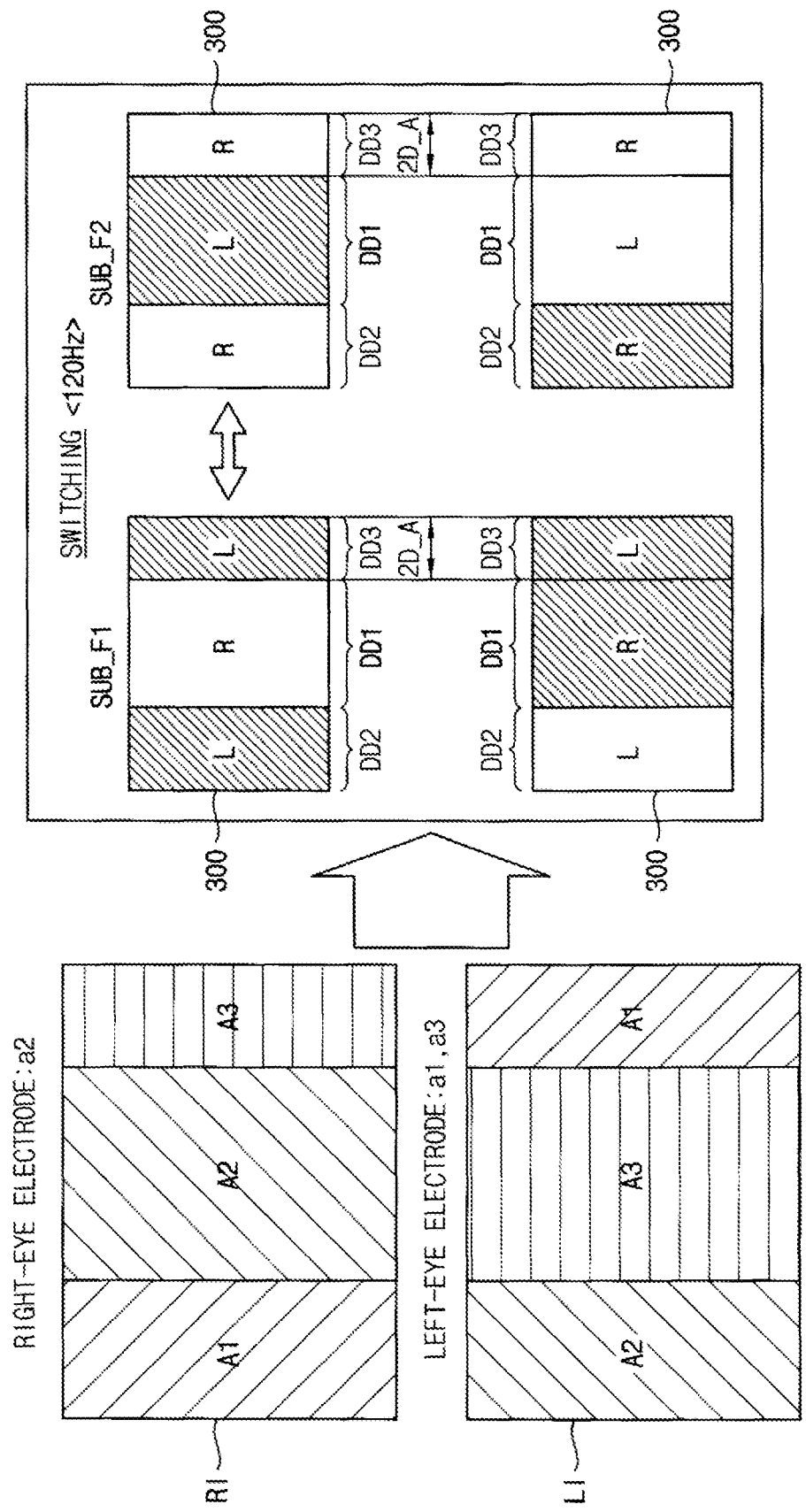
FIG. 20 is a diagram illustrating a 3D display apparatus according to exemplary embodiments of the invention.

FIG. 20 is a diagram illustrating a 3D display apparatus according to exemplary embodiments of the invention.

Referring to FIGS. 8, 9A, 9B and 20, the 3D display apparatus includes the shutter panel 510 as shown in FIG. 8. The shutter panel 510 may include a unit part U having three shutter electrodes, which are sequentially arranged, corresponding to one lens LU. The unit part may include a first shutter electrode a1, a second shutter electrode a2 and a third shutter electrode a3. According to the present exemplary embodiments, the first and third shutter electrodes a1 and a3 are predetermined as the left-eye electrode and the second shutter electrode a2 are predetermined as the right-eye electrode.

For example, when the observer is located nearer than the OVD, the method of displaying the left-eye image and the right-eye image on the display panel is explained.

As described in FIG. 9A, the control part analyzes the right-eye incident image RI based on the observer's right-eye Reye which is located nearer than the OVD. The right-eye incident image RI being incident on the observer's right-eye located nearer than the OVD is a bilateral symmetry with respect to a right-eye incident image RI' being incident on the observer's right-eye located at the OVD.

The right-eye incident image RI includes image corresponding to the light which concentrated in the first, second and third concentrating areas A1, A2 and A3. The light transmitted through the first shutter electrode a1 operating as the opening part is concentrated in the first concentrating area A1. The light transmitted through the second shutter electrode a2 operating as the opening part is concentrated in the second concentrating area A2. The light transmitted through the third shutter electrode a3 operating as the opening part is concentrated in the third concentrating area A3.

During the first sub frame SUB_F1, the first and third shutter electrodes a1 and a3 of the shutter panel are operated as the opening part and the remaining second shutter electrode a2 are operated as the blocking part.

In the first sub frame SUB_F1, the display driving part 400 displays the right-eye image R on a first display block DD1 of the display panel 300 corresponding to the second concentrating area A2 of the right-eye incident image RI and displays the left-eye image L on second and third display blocks DD2 and DD3 of the display panel 300 corresponding to the first and third concentrating areas A1 and A3 of the right-eye incident image RI.

Therefore, the observer's right-eye Reye observes the right-eye image R displayed on the first display block DD1 and does not observe the left-eye image L displayed on the second and third display blocks DD2 and DD3.

In this case, referring to the left-eye incident image LI, the observer's left-eye Leye observes the left-eye image L displayed on the second display block DD2 which corresponds to the second concentrating area A2 by the second shutter electrode a2 of the right-eye electrode, which are operated as the opening part. However, the observer's left-eye Leye does not observe the right-eye image R and the left-eye image L displayed on the first and third display blocks DD1 and DD3 which corresponds to the third and first concentrating areas A1 and A3 by the first and third shutter electrodes a1 and a3 of the left-eye electrode.

Therefore, during the first sub frame, the observer's right-eye Reye observes the right-eye image R displayed on the first display block DD1 and the observer's left-eye Leye observes the left-eye image L displayed on the second display block DD2. Thus, the left-eye image L of the third display block DD3 is all observed to the observer's two eyes so that the 2D image may be observed on the third display block DD3. Then, during the second sub frame SUB_F2, the first and third shutter electrodes a1 and a3 of the shutter panel are operated as the opening part and the remaining second shutter electrode a2 is operated as the blocking part.

In the second sub frame SUB_F2, the display driving part 400 displays the right-eye image R on the second and third display blocks DD2 and DD3 of the display panel 300 corresponding to the first and third concentrating areas A1 and A3 of the right-eye incident image RI and displays the left-eye image L on the first display block DD1 of the display panel 300 corresponding to the second concentrating areas A2 of the right-eye incident image RI.

Therefore, the observer's right-eye Reye observes the right-eye image R displayed on the second and third display blocks DD2 and DD3 and does not observe the left-eye image L displayed on the first display block DD1.

In this case, referring to the left-eye incident image LI, the observer's left-eye Leye observes the left-eye and right-eye images L and R displayed on the first and third display blocks DD1 and DD3 which corresponds to the third and first concentrating areas A3 and A1 by the third and first shutter electrodes a3 and a1 of the left-eye electrode. However, the observer's left-eye Leye does not observe the right-eye image R displayed on the second display block DD2 which corresponds to the second concentrating area A2 by the second shutter electrode a2 of the right-eye electrode.

Therefore, during the second sub frame, the observer's right-eye Reye observes the right-eye image R displayed on the second and third display blocks DD2 and DD3 and the observer's left-eye Leye observes the left-eye and right-eye images L and R displayed on the first and third display blocks DD1 and DD3. Thus, the right-eye image R of the third display block DD3 is all observed to the observer's two eyes so that the 2D image may be observed on the fourth display block DD4.

According to the exemplary embodiments, the control part may display a preset image on the third display block DD3 on which the 2D image is observed. The preset image may be a black image. For example, the display driving part 400 displays the black image on the third display block DD3 during the first sub frame SUB_F1 and the second sub frame SUB_F2. Thus, the display quality of the 3D image may be improved.

As described above, the left-eye and right-eye images displayed on the display panel are controlled by the display block based on the observer's position so that the 3D image may be displayed.

According to the exemplary embodiments as described in FIGS. 19 and 20, the 3D image displayed on the display panel is controlled based on the observer's position. The method of controlling the 3D image may be summarized as the following.

The control part analyzes the incident image being incident on the observer's one eye, for example, the right-eye incident image being incident on the observer's right-eye, based on the images, which are concentrated in the concentrating areas at the OVD, corresponding to the shutter electrodes. The control part controls the left-eye image and the right-eye image displayed on the display panel based on the right-eye incident image. The control part displays the left-eye image on the display block of the display panel corresponding to the concentrating area in which the light transmitted through the predetermined left-eye shutter electrode is concentrated and displays the right-eye image on the display block of the display panel corresponding to the concentrating area in which the light transmitted through the predetermined right-eye shutter electrode is concentrated.

For example, during the first sub frame for the right-eye, the control part displays the right-eye image on the display block corresponding to the concentrating area of the predetermined right-eye electrode and displays the left-eye image on the display block corresponding to the concentrating area of the predetermined left-eye electrode. And then, during the second sub frame for the left-eye, the control part displays the left-eye image on the display block corresponding to the concentrating area of the predetermined right-eye electrode and displays the right-eye image on the display block corresponding to the concentrating area of the predetermined left-eye electrode. Therefore, the observer may observe the 3D image.

According to the exemplary embodiments of the present invention, the 3D display apparatus may control the shutter electrode of the shutter panel to display the 3D image based on the observer's position. In addition, the 3D display apparatus may control the 3D image displayed on the display panel based on the observer's position so that the observer may observe the 3D image.

Figure 21:
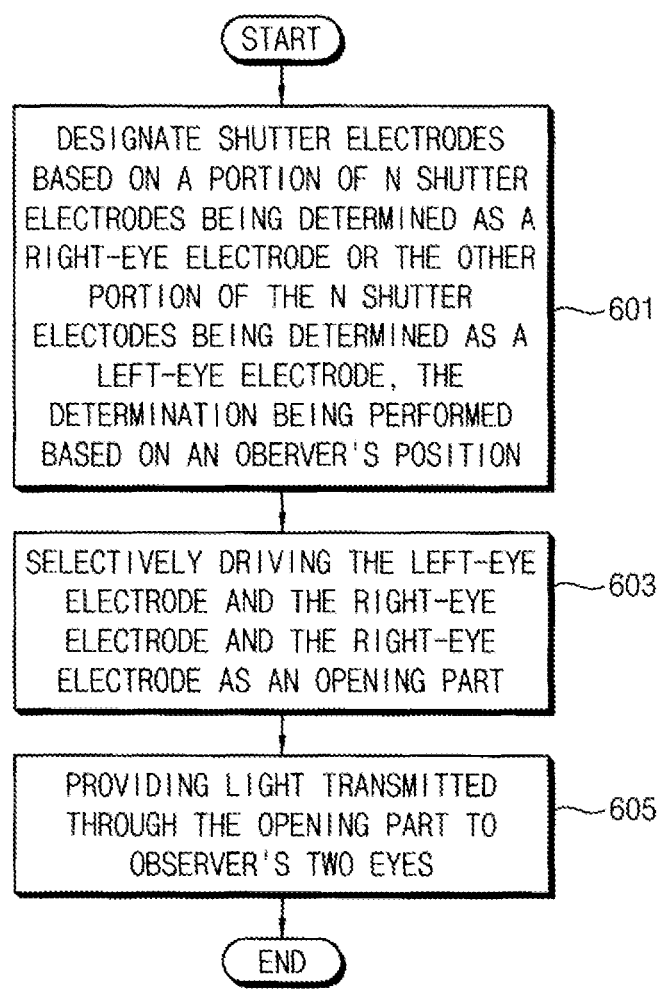
FIG. 21 is a flowchart of a process of a method of displaying a 3D image according to exemplary embodiments of the present invention.

FIG. 21 is a flowchart of a process of a method of displaying a three-dimensional ("3D") image according to exemplary embodiments of the present invention. As in step 601, the method includes designating shutter electrodes of a unit part based on a portion of n shutter electrodes being determined as a left-eye electrode or the other portion of the n shutter electrodes being determined as a right-eye electrode. The unit part includes 'n' shutter electrodes (herein, n is a natural number). The determination is performed based on an observer's position. The method also includes, per step 603, selectively driving the left-eye electrode and the right-eye electrode as an opening part based on an image displayed on a display panel to transmit light through the opening part, to transmit light via the opening part. As in step 605, the method includes providing light transmitted through the opening part to an observer's two eyes through a lens plate, the lens plate comprising a plurality of lenses.

In exemplary embodiments of the invention, there is provided a method of displaying a three-dimensional ("3D") image, the method includes determining a shutter electrode of an unit part included in a shutter panel as a left-eye electrode and a right-eye electrode, the unit part including 'n' shutter electrodes (herein, n is a natural number), selectively driving the left-eye electrode and the right-eye electrode as an opening part based on an image displayed on a display panel to transmit light through the opening part, and providing light transmitted through the opening part with an observer's two eyes through a lens plate, the lens plate including a plurality of lenses.

In exemplary embodiments of the invention, the method may further include determining n concentrating areas at a an optimum view distance ("OVD"), lights emitting from the n shutter electrodes of the unit part respectively concentrating on the n concentrating areas at the OVD, each of the n concentrating areas having a width of about 2E/n, and analyzing the concentrating area corresponding to an image included in an incident image which is incident on an observer's one eye, based on the n concentrating areas and the observer's position.

In exemplary embodiments of the invention, when the observer is located within the OVD, some of the n shutter electrodes in the unit part may be determined as the right-eye electrode and the other of the n shutter electrodes in the unit part may be determined as the left-eye electrode.

In exemplary embodiments of the invention, when n is an even number, n/2 shutter electrodes of the n shutter electrodes may be determined as the right-eye electrode and the remaining n/2 shutter electrodes of the n shutter electrodes may be determined as the left-eye electrode. Wherein n may be four.

In exemplary embodiments of the invention, when n is an odd number more than three, one of (n+1)/2 shutter electrodes and (n+1)/2−1 shutter electrodes may be determined as the right-eye electrode, and the other may be determined as the left-eye electrode. Wherein n may be three.

In exemplary embodiments of the invention, the method may further include determining a division boundary on the shutter panel based on the concentrating area, when the observer is located out of the OVD, and determining the right-eye electrode and the left-eye electrode in a control area of the shutter panel, the control area being divided by the division boundary.

In exemplary embodiments of the invention, when n is an odd number, the division boundary may be determined by an extension line, the extension line which connects a center of an area in which the observer's one eye is located with a center of connecting line between a center of the concentrating area and a boundary of the concentrating area.

In exemplary embodiments of the invention, when n is an even number and n/2 is an odd number, the division boundary may be determined by an extension line, the extension line which connects a center of an area in which the observer's one eye is located with a boundary of the concentrating area.

In exemplary embodiments of the invention, when n is an even number and n/2 is the even number, the division boundary may be determined by an extension line, the extension line which connects a center of an area in which the observer's one eye is located with a center of the concentrating area.

In exemplary embodiments of the invention, the driving the left-eye electrode and the right-eye electrode as the opening part may include driving the right-eye electrode as the opening part during a first sub frame during which a right-eye image is displayed on the display panel, and driving the left-eye electrode as the opening part during a first sub frame during which a left-eye image is displayed on the display panel.

In exemplary embodiments of the invention, the method may further include predetermining the right-eye electrode and the left-eye electrode without reference to the observer's position, and displaying a right-eye image and a left-eye image by a display block on the display panel based on the observer's position.

In exemplary embodiments of the invention, the display block may be determined by an extension line, the extension line which connects a center of an area in which the observer's one eye is located with a boundary of the concentrating area.

In exemplary embodiments of the invention, the displaying the right-eye image and the left-eye image by the display block may include displaying the right-eye image on the display block corresponding to the concentrating area of the predetermined right-eye electrode and the left-eye image on the display block corresponding to the concentrating area of the left-eye predetermined electrode during a first sub frame, and displaying the left-eye image on the display block corresponding to the concentrating area of the predetermined right-eye electrode and the right-eye image on the display block corresponding to the concentrating area of the predetermined left-eye electrode during a second sub frame.

In exemplary embodiments of the invention, the method may further include displaying a preset image on a display block on which the observer's one eye observes a same left-eye or right-eye image during the first and second sub frames.

In exemplary embodiments of the invention, when the number of the observers is plural, the shutter panel includes a multi-unit part which including a plurality of the unit parts, the number (m) of the shutter electrodes in the multi-unit part may be more than a number multiplying the number of the observers by the number (n) of the shutter electrodes in the unit part (herein, m is a natural number).

In exemplary embodiments of the invention, there is provided a three-dimensional ("3D") display apparatus. The display apparatus includes a display panel displaying a right-eye image and a left-eye image, a shutter panel including an unit part which includes a plurality of shutter electrodes, the unit part operating as an opening part transmitting a light and as a blocking part blocking the light, a lens plate including a plurality of lenses arranged in a direction and, providing the light transmitted through the opening part with an observer's right-eye and left-eye, a control part determining the shutter electrode of the unit part as a right-eye electrode and a left-eye electrode, and a shutter driving part selectively driving the right-eye electrode and the left-eye electrode as the opening part based on an image displayed on the display panel.

In an exemplary embodiment of the invention, the control part may determine n concentrating areas at an optimum view distance ("OVD") (herein, n is a natural number), lights emitting from the n shutter electrodes of the unit part respectively concentrating on the n concentrating areas, each of the n concentrating areas having a width of about 2E/n, and analyze a concentrating area corresponding to an image included in an incident image which is incident on an observer's one eye, based on the n concentrating areas and the observer's position.

In an exemplary embodiment of the invention, when the observer is located within the OVD, the control part may determine some of the n shutter electrodes in the unit part as the right-eye electrode and the other of the n shutter electrodes in the unit part as the left-eye electrode.

In an exemplary embodiment of the invention, when n is an even number, the control part may determine n/2 shutter electrodes of the n shutter electrodes as the right-eye electrode and the remaining n/2 shutter electrodes of the n shutter electrodes as the left-eye electrode.

In an exemplary embodiment of the invention, when n is an odd number more than three, the control part may determine one of (n+1)/2 shutter electrodes and (n+1)/2−1 shutter electrodes as the right-eye electrode, and the other as the left-eye electrode.

In an exemplary embodiment of the invention, when the observer is located out of the OVD, the control part may determine a division boundary on the shutter panel based on the concentrating area, and determine the right-eye electrode and the left-eye electrode in a control area of the shutter panel, the control area being divided by the division boundary.

In an exemplary embodiment of the invention, when n is an odd number, the control part may determine a division boundary by an extension line, the extension line which connects a center of an area in which the observer's one eye is located with a center of connecting line between a center of the concentrating area and a boundary of the concentrating area.

In an exemplary embodiment of the invention, when n is an even number and n/2 is an odd number, the control part may determine a division boundary by an extension line, the extension line which connects a center of an area in which the observer's one eye is located with a boundary of the concentrating area.

In an exemplary embodiment of the invention, when n is an even number and n/2 is the even number, the control part may determine a division boundary by an extension line, the extension line which connects a center of an area in which the observer's one eye is located with a center of the concentrating area.

In an exemplary embodiment of the invention, the shutter driving part may drive the right-eye electrode as the opening part during a first sub frame during which a right-eye image is displayed on the display panel, and drive the left-eye electrode as the opening part during a first sub frame during which a left-eye image is displayed on the display panel.

In an exemplary embodiment of the invention, the control part may predetermine the right-eye electrode and the left-eye electrode without reference to the observer's position, and display a right-eye image and a left-eye image by a display block on the display panel based on the observer's position.

In an exemplary embodiment of the invention, the display block may be determined by an extension line, the extension line which connects a center of an area in which the observer's one eye is located with a boundary of the concentrating area.

In an exemplary embodiment of the invention, the 3D display apparatus may further include a display driving part displaying an image on the display panel based on a control of the control part, wherein the display driving part may display the right-eye image on the display block corresponding to the concentrating area of the predetermined right-eye electrode and the left-eye image on the display block corresponding to the concentrating area of the predetermined left-eye electrode during a first sub frame, and display the left-eye image on the display block corresponding to the concentrating area of the predetermined right-eye electrode and the right-eye image on the display block corresponding to the concentrating area of the predetermined left-eye electrode during a second sub frame.

In an exemplary embodiment of the invention, the shutter driving part may drive the predetermined right-eye electrode as the opening part during the first sub frame and drives the predetermined left-eye electrode as the opening part during the second sub frame.

In an exemplary embodiment of the invention, the display driving part may display a preset image on a display block in which the observer's one eye observes a same left-eye or right-eye image during the first and second sub frames.

In an exemplary embodiment of the invention, when the number of the observers is plural, the shutter panel includes a multi-unit part including a plurality of unit parts, and the number (m) of the shutter electrodes in the multi-unit part may be more than a number multiplying the number of the observers by the number (n) of the shutter electrodes in the unit part (herein, m is a natural number).

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of displaying a three-dimensional ("3D") image, the method comprising:
designating shutter electrodes of a unit part as a left-eye electrode or a right-eye electrode, the unit part comprising 'n' shutter electrodes, n being a natural number;
selectively driving the left-eye electrode and the right-eye electrode as an opening part, to transmit light through the opening part, based on an image to be displayed on the display panel; and
providing light transmitted through the opening part to an observer via a lens plate unit, the lens plate unit comprising a plurality of lenses.

2. The method of claim 1, further comprising:
determining n concentrating areas at an optimum view distance ("OVD"), lights emitting from the n shutter electrodes of the unit part respectively concentrating on the n concentrating areas at the OVD, each of the n concentrating areas having a width of about $2E/n$, wherein, E is a distance between an observer's right-eye and an observer's left-eye; and
analyzing the concentrating area corresponding to an image of an incident image which is incident on an observer's one eye, based on the n concentrating areas and the observer's position.

3. The method of claim 2, wherein when the observer is located within the OVD,
a portion of the n shutter electrodes in the unit part are designated as the right-eye electrode and the other portion of the n shutter electrodes in the unit part are designated as the left-eye electrode.

4. The method of claim 3, wherein when n is an even number, n/2 shutter electrodes of the n shutter electrodes are designated as the right-eye electrode and the remaining n/2 shutter electrodes of the n shutter electrodes are designated as the left-eye electrode.

5. The method of claim 3, wherein n is four.

6. The method of claim 3, wherein when n is an odd number greater than or equal to three, one of (n+1)/2 shutter electrodes and (n+1)/2−1 shutter electrodes is determined as the right-eye electrode, and the others are designated as the left-eye electrode.

7. The method of claim 6, wherein n is three.

8. The method of claim 2, further comprising:
determining a division boundary on the shutter panel based on the concentrating area, when the observer is located beyond the OVD; and
designating the right-eye electrode and the left-eye electrode in a control area of the shutter panel, the control area being divided by the division boundary.

9. The method of claim 8, wherein when n is an odd number, the division boundary is determined by an extension line, the extension line connecting a center of an area in which the observer's one eye is located with a center of a connecting line between a center of the concentrating area and a boundary of the concentrating area.

10. The method of claim 8, wherein when n is an even number and n/2 is an odd number, the division boundary is determined by an extension line, the extension line connecting a center of an area in which the observer's one eye is located with a boundary of the concentrating area.

11. The method of claim 8, wherein when n is an even number and n/2 is the even number, the division boundary is determined by an extension line, the extension line connecting a center of an area in which the observer's one eye is located with a center of the concentrating area.

12. The method of claim 2, wherein selectively driving the left-eye electrode and the right-eye electrode as the opening part comprises:
driving the right-eye electrode as the opening part during a first sub frame during which a right-eye image is to be displayed on the display panel; and
driving the left-eye electrode as the opening part during a first sub frame during which a left-eye image is to be displayed on the display panel.

13. The method of claim 12, wherein the displaying the right-eye image and the left-eye image by the display block comprise:
displaying the right-eye image on the display block corresponding to the concentrating area of the predetermined right-eye electrode and the left-eye image on the display block corresponding to the concentrating area of the left-eye predetermined electrode during a first sub frame; and
displaying the left-eye image on the display block corresponding to the concentrating area of the predetermined right-eye electrode and the right-eye image on the display block corresponding to the concentrating area of the predetermined left-eye electrode during a second sub frame.

14. The method of claim 13, further comprising:
driving the predetermined right-eye electrode as the opening part during the first sub frame; and
driving the predetermined left-eye electrode as the opening part during the second sub frame.

15. The method of claim 13, further comprising:
displaying a preset image on a display block on which the observer's one eye observes a same left-eye or right-eye image during the first and second sub frames.

16. The method of claim 2, further comprising;
designating the right-eye electrode and the left-eye electrode without reference to the observer's position; and
displaying a right-eye image and a left-eye image by a display block on the display panel based on the observer's position.

17. The method of claim 16, wherein the display block is determined by an extension line, the extension line connecting a center of an area in which the observer's one eye is located with a boundary of the concentrating area.

18. The method of claim 2, wherein when the number of the observers is plural, the shutter panel comprises a multi-unit part which comprises a plurality of the unit parts,
the number (m) of the shutter electrodes in the multi-unit part is more than a number multiplying the number of the observers by the number (n) of the shutter electrodes in the unit part (herein, m is a natural number).

* * * * *